(12) United States Patent
Robey

(10) Patent No.: US 7,564,349 B2
(45) Date of Patent: Jul. 21, 2009

(54) POSITION INDICATOR APPARATUS AND METHOD

(75) Inventor: Timothy Robey, Windham, ME (US)

(73) Assignee: Bellheimer Metallwerk GmbH, Bellheim/Pfalz (DE)

( * ) Notice: Subject to any disclaimer, the term of this patent is extended or adjusted under 35 U.S.C. 154(b) by 0 days.

(21) Appl. No.: 11/772,789

(22) Filed: Jul. 2, 2007

(65) Prior Publication Data

US 2008/0015733 A1 Jan. 17, 2008

Related U.S. Application Data

(60) Provisional application No. 60/818,328, filed on Jul. 5, 2006, provisional application No. 60/877,573, filed on Dec. 28, 2006.

(51) Int. Cl.
| G05B 19/00 | (2006.01) |
| G05B 23/00 | (2006.01) |
| G05B 7/00  | (2006.01) |
| B65G 1/00  | (2006.01) |
| G07F 11/00 | (2006.01) |

(52) U.S. Cl. .................. 340/540; 340/5.92; 414/331.15; 221/5

(58) Field of Classification Search ... 340/568.1–572.9, 340/545.6, 545.9, 686.1, 686.3, 815.45, 5.91, 340/5.92; 705/22, 28; 235/385; 221/4–6; 414/22.63–22.67, 148, 222.02, 266–272
See application file for complete search history.

(56) References Cited

U.S. PATENT DOCUMENTS

| 3,838,266 | A |   | 9/1974  | Jonathan |
| 4,106,628 | A | * | 8/1978  | Warkentin et al. .......... 209/556 |
| 4,155,457 | A | * | 5/1979  | Wilbert .......................... 211/4 |
| 4,792,273 | A | * | 12/1988 | Specht ........................ 414/807 |
| 4,812,629 | A |   | 3/1989  | O'Neil et al. |
| 4,813,752 | A |   | 3/1989  | Schindler |
| 4,858,743 | A |   | 8/1989  | Paraskevakos et al. |
| 4,918,579 | A |   | 4/1990  | Bennett |
| 5,141,128 | A |   | 8/1992  | Pippin |
| 5,159,560 | A |   | 10/1992 | Newell et al. |
| 5,159,960 | A |   | 11/1992 | Pringle |
| 5,249,855 | A |   | 10/1993 | Franklin et al. |
| 5,330,062 | A |   | 7/1994  | Murphree |

(Continued)

FOREIGN PATENT DOCUMENTS

DE 3610347 A1 10/1987

(Continued)

OTHER PUBLICATIONS

Anon, Carousel cuts costs for pharmaceutical chain, Modern Materials Handling, vol. 60 No. 11 Oct. 2, 2005, 1 page.

(Continued)

*Primary Examiner*—Jennifer Mehmood
(74) *Attorney, Agent, or Firm*—Crowell & Moring LLP

(57) ABSTRACT

An apparatus and method for indicating a position of an item to be processed from a shelf is disclosed. An embodiment of the apparatus includes a frame member and an indicator moveable on the frame member. The indicator is positionable in front of the item to be processed from the shelf. In an embodiment of a method for indicating a position of an item to be processed from a shelf, the method includes moving the indicator on the frame member such that the indicator is positioned in front of the item to be processed from the shelf.

22 Claims, 26 Drawing Sheets

U.S. PATENT DOCUMENTS

| | | |
|---|---|---|
| 5,441,165 A | 8/1995 | Kemp et al. |
| 5,467,892 A | 11/1995 | Schlamp |
| 5,472,309 A | 12/1995 | Bernard, II et al. |
| 5,499,707 A | 3/1996 | Steury |
| 5,533,645 A | 7/1996 | Wittern, Jr. et al. |
| 5,546,315 A | 8/1996 | Kleinschnitz |
| 5,631,536 A | 5/1997 | Tseng |
| 5,636,750 A | 6/1997 | Heyl |
| 5,670,778 A | 9/1997 | Smith |
| 5,790,374 A | 8/1998 | Wong |
| 5,799,124 A | 8/1998 | Zorn et al. |
| 5,836,662 A | 11/1998 | Robey |
| 5,905,653 A | 5/1999 | Higham et al. |
| 5,915,824 A | 6/1999 | Straat |
| 6,010,239 A | 1/2000 | Hardgrave et al. |
| 6,029,851 A | 2/2000 | Jenkins et al. |
| 6,123,223 A | 9/2000 | Watkins |
| 6,241,119 B1* | 6/2001 | Stephenson .................. 221/120 |
| 6,388,572 B1* | 5/2002 | Salter .......................... 340/546 |
| 6,413,356 B1 | 7/2002 | Chokshi et al. |
| 6,464,142 B1 | 10/2002 | Denenberg et al. |
| 6,663,273 B2 | 12/2003 | Robey |
| 6,694,217 B2 | 2/2004 | Bloom |
| 6,715,910 B2 | 4/2004 | Robey |
| 6,748,295 B2 | 6/2004 | Tilles et al. |
| 6,854,815 B1 | 2/2005 | Smith |
| 6,873,881 B1* | 3/2005 | Schneible, Sr. ............. 700/216 |
| 6,874,684 B1* | 4/2005 | Denenberg et al. .......... 235/381 |
| 6,985,797 B2 | 1/2006 | Spano, Jr. et al. |
| 7,072,737 B2 | 7/2006 | Lunak et al. |
| 7,085,621 B2 | 8/2006 | Spano, Jr. et al. |
| 7,347,364 B2* | 3/2008 | Walker et al. ................ 235/381 |
| 2002/0103573 A1 | 8/2002 | Fellows et al. |
| 2002/0147597 A1 | 10/2002 | Connors et al. |
| 2004/0031058 A1 | 2/2004 | Reisman |
| 2004/0193317 A1 | 9/2004 | Lunak et al. |
| 2004/0210341 A1 | 10/2004 | Wallace et al. |
| 2005/0065645 A1 | 3/2005 | Liff et al. |
| 2005/0098626 A1 | 5/2005 | Jordan et al. |
| 2005/0125097 A1 | 6/2005 | Chudy et al. |
| 2005/0158109 A1 | 7/2005 | Silverbrook et al. |
| 2005/0179547 A1* | 8/2005 | Maloney ................... 340/568.1 |
| 2006/0074524 A1 | 4/2006 | Chirnomas |
| 2006/0216138 A1* | 9/2006 | Schaefer ...................... 414/266 |
| 2006/0255951 A1 | 11/2006 | Roeder et al. |
| 2008/0131241 A1* | 6/2008 | King .......................... 414/267 |

OTHER PUBLICATIONS

Appolonia, LJ, Bergh, RH, Bothun, ME, Buettner, HM, Douthitt, BL, Highum, EA, Holecek, JJ, Automated Parts-Handling System, Jun. 1, 1985 UTC United States, IP.com, Prior Art Database Feb. 18, 2005, 3 pages.

Lebaron, T.; Hoffman, M. L., Using Simulation to Optimize a Horizontal Carousel Storage System, Winter Simulation Conference, 1998; vol. 2, pp. 1247-1253, IEEE, 1998.

Maloney, David, Efficiency soars at ITT Industries, Modern Materials Handling, vol. 58 No. 2, Feb. 2003, pp. 31-33.

Remstar Pick-Light Technology, Remstar International Inc., Aug. 1998, 2 pages.

Horizontal Carousels Catalog, Remstar International Inc., 6 pages, Dec. 2000.

* cited by examiner

POSITION INDICATOR APPARATUS AND METHOD

This application claims the benefit of U.S. Provisional Application No. 60/818,328, filed Jul. 5, 2006, and U.S. Provisional Application No. 60/877,573, filed Dec. 28, 2006, the disclosures of which are hereby expressly incorporated by reference.

BACKGROUND OF THE INVENTION

In various systems where items are to be processed from a shelf, such as from a shelf of a horizontal carousel system, the location of the items must be identified to the processor in order to ensure that the proper items are processed. Known devices suffer drawbacks in their ability to identify the items.

Therefore, it would be desirable to provide an improved position indicator apparatus and method.

SUMMARY OF THE INVENTION

In an embodiment of an apparatus of the present invention for indicating a position of an item to be processed from a shelf, the apparatus includes a frame member and an indicator moveable on the frame member. The indicator is positionable in front of the item to be processed from the shelf.

In an embodiment of a method for indicating a position of an item to be processed from a shelf, the method includes moving the indicator on the frame member such that the indicator is positioned in front of the item to be processed from the shelf.

DETAILED DESCRIPTION OF THE DRAWINGS

Figure 1C:
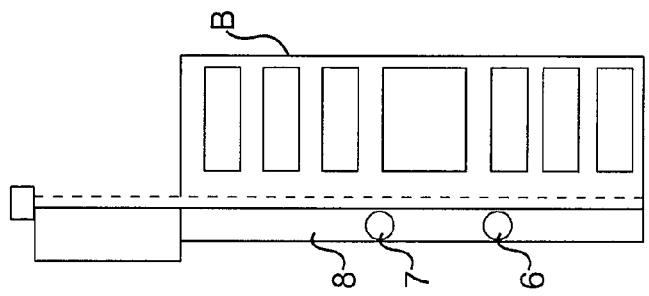
FIG. 1C is a side view of an embodiment of the system of the present invention.

As will be described further below, the present invention provides an indicator system that may be used with a Horizontal Carousel System that provides an indicator directly in front of the shelf on which the item that is to be processed is located. The indicator is movable vertically so that it is positionable directly in front of the shelf on which the item is located. The indicator station may also, additionally, block from view (and block from access) all of the other shelves of the carrier which do not contain the item of interest. The indicator station can also monitor reach-thru, e.g., by vertical photoelectric beams, to determine if the correct item has been accessed from the open shelf. The indicator can be fitted with RFiD reader antenna(s) to scan inventory automatically as the indicator sweeps up or down past the shelves, or to identify product as it is manually pulled over (the top or bottom) off from the carrier's shelves. Among other benefits, this invention makes it easier for the processor to identify the item that is to be processed. The invention will be described further below with respect to the drawing figures.

In this specification, a Horizontal Carousel may be referred to as a closed loop series of rotating carriers, typically containing shelves with containers. Further, a message display may be any type of data display, including but not limited to LCD or LED, and segmented (7 and 15 segment) or dot matrix (typically 5×7 dot) displays and full computer monitors.

Further, the invention provides benefits related to any type of processing that may be related to an item including, but not limited to, picking of the item from a shelf of the carrier, storing an item in a bin of the carrier, inventorying the item, counting the item, etc.

Figure 1B:
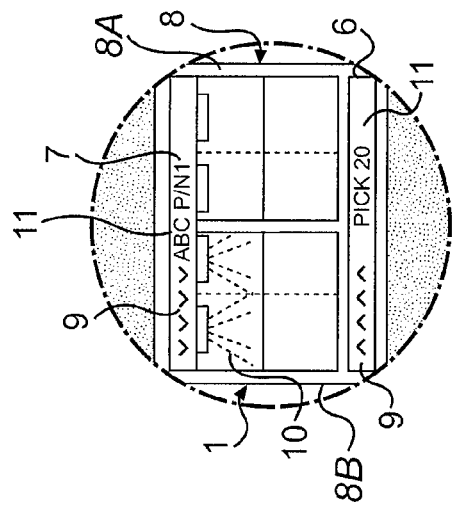
FIG. 1B further illustrates the indicator of the system of FIG. 1A.
Figure 1A:
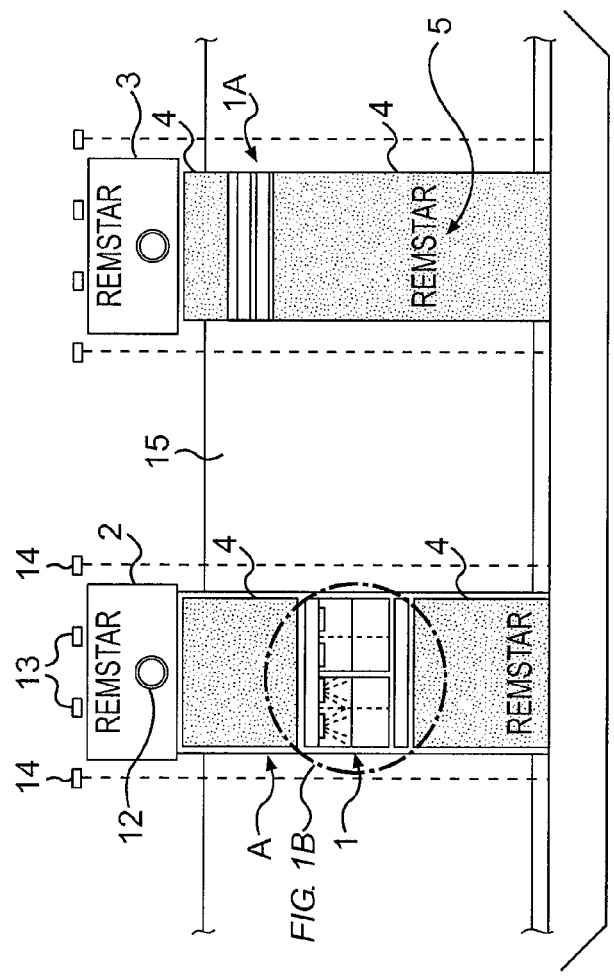
FIG. 1A illustrates an embodiment of the system of the present invention.

FIG. 1A illustrates an embodiment of the system of the present invention. As can be seen, the indicator system includes at least one indicator 1 on an indicator station frame structure A and a control head 2. In this embodiment, the indicator includes message indicator bars 6 and 7, which can be seen in more detail in FIG. 1B. The indicator is placed directly in front of the carrier from which the item to be processed is located. This figure illustrates an example of two individual indicators 1 and 1A that are movable vertically with respect to the carousels B that they are associated with such that they are able to be positioned directly in front of the carrier, and thus, indicate the item to be processed from the proper shelf of the carousel. The second indicator 1A is shown with control head 3. Of course, the indicator system can include any number of indicators and control heads and is not limited to only including one indicator and one associated control head. FIG. 1C is a side view of an embodiment of the present invention.

As can be further seen in FIG. 1A, roller shades 4 can also be provided such that they cover the shelves that do not contain the item that is to be processed. This can provide, among other benefits, further assurance that the wrong item is not processed from the wrong shelf since only the shelf with the item to be processed is accessible. The roller shades block access to the other shelves. Advertising material 5, or any other type of information, can be provided on the shades. As can be understood, the shades can be provided on rollers such that as the indicator moves vertically to indicate another item that is to be processed from another shelf, the shades either elongate or retract such that they cover the shelves that do not contain the item. Other material, such as bellows (commonly found in the robotics industry) could also serve the same purpose.

The indicators can be comprised of bars that move vertically on a frame. As can be seen in FIG. 1B, indicator 1 may include lower bar 6 and upper bar 7. The bars move vertically on frame 8. Frame 8 may include vertical frame members 8A and 8B. On each bar, indicator lights 9 may be provided which point toward the item to be processed from the accessible shelf. Task lighting 10 may also be provided to illuminate the processing area. Identification information 11 may also be provided on the upper and lower bars to provide identifying information for the item to be processed, the shelf position, quantity, part reference number, type of transaction (retrieve, pick, count, etc.), etc.

On an upper area of the indicator system, a task ready light 12 may be provided that indicates that the system has a task ready and waiting for the operator's attention. Other displays or audible annunciators may be provided as well on the upper area.

Also, photocells 13 and 14 can be provided in the system. The photocells can detect a variety of activities in the system, such as, access by a user into the exposed shelf position using photocells 13, and/or containers that may be hanging off the end of the shelf (product overhang photocells 14), etc. The photocells 13 can also sense if the curtain is pushed into the machine and shut-down carousel movement to protect the machine or the operator from harm. As is known, the photocells cast a beam of light and when the beam is interrupted, this interruption is detected to provide an indication of monitored activity. Photocells used in this application are typically the retroreflective type using a reflector on the floor, but they are not limited to this type.

Panels 15 can be provided between carousels, and thus, between individual indicator stations. This brings further benefit by providing a convenient means for connecting panels to provide a physical isolation barrier between machine and operator for safety purposes.

Figure 2:
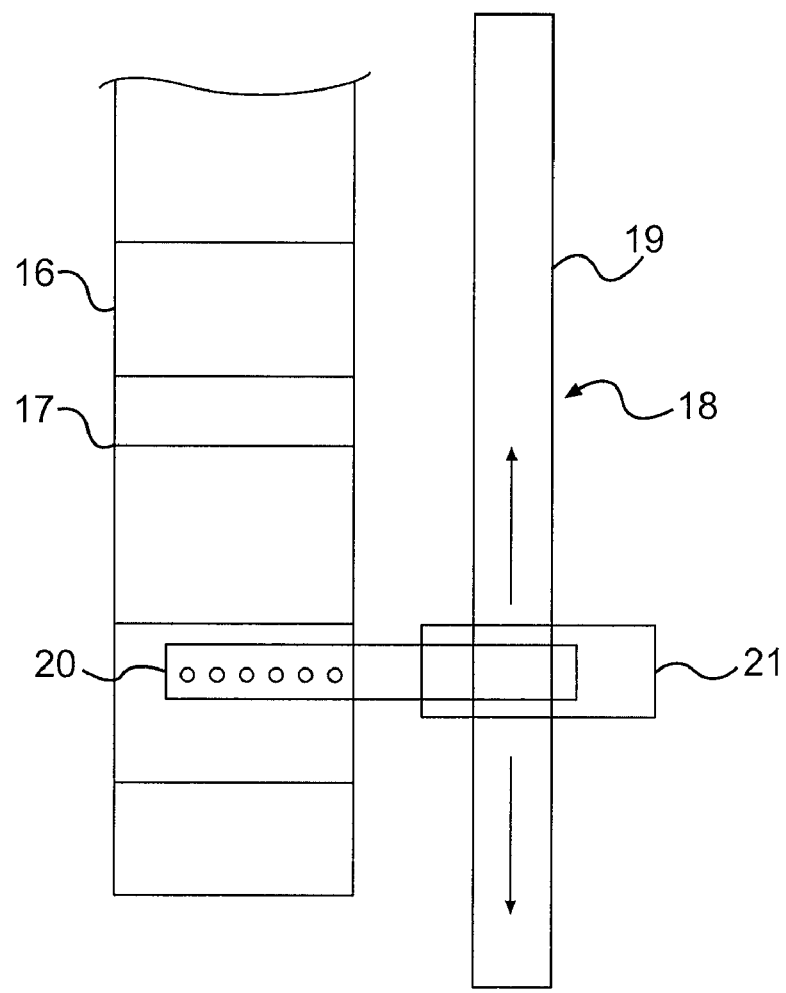
FIG. 2 illustrates an alternative embodiment of the system of the present invention.
Figure 2:
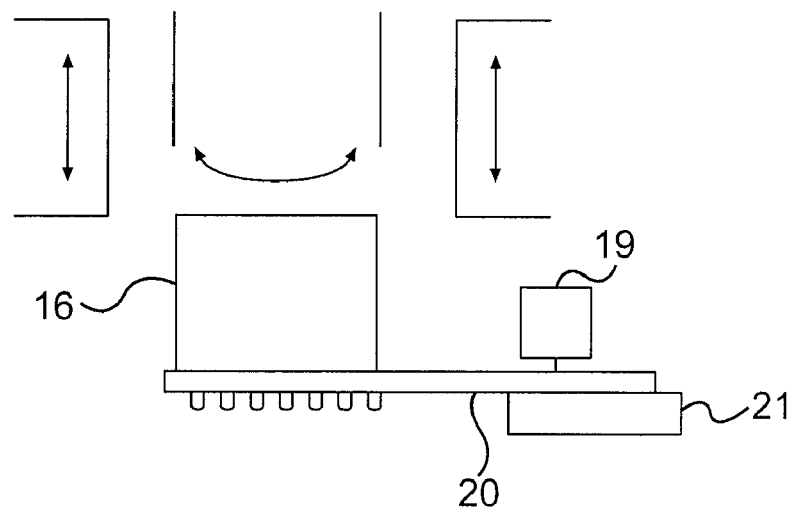

FIG. 2 shows another embodiment of the system of the present invention. As can be seen, a moving carrier 16 contains shelves 17. The indicator system 18 includes a linear slide 19 that is positioned adjacent to the carrier 16. The system 18 includes a vertically movable indicator bar 20 that, again, is vertically movable on slide 19 such that it is positionable directly in front of the shelf, and item, which is to be processed. Bar 20 may include lights to light a particular position on the bar at which the item to be processed is located A message center 21 can provide additional information, information related to the item to be processed, location of the item to be processed, quantity for the transaction, part numbers, etc. Of course, message center bars like bars 6 and 7 discussed previously could also be utilized in this embodiment, which is the same concept only with the moving mechanism positioned adjacent to the carousel rather than directly in front of it. This could have the benefit of reduced costs, and provide service to a second carousel adjacent to the linear slide station.

Figure 3:
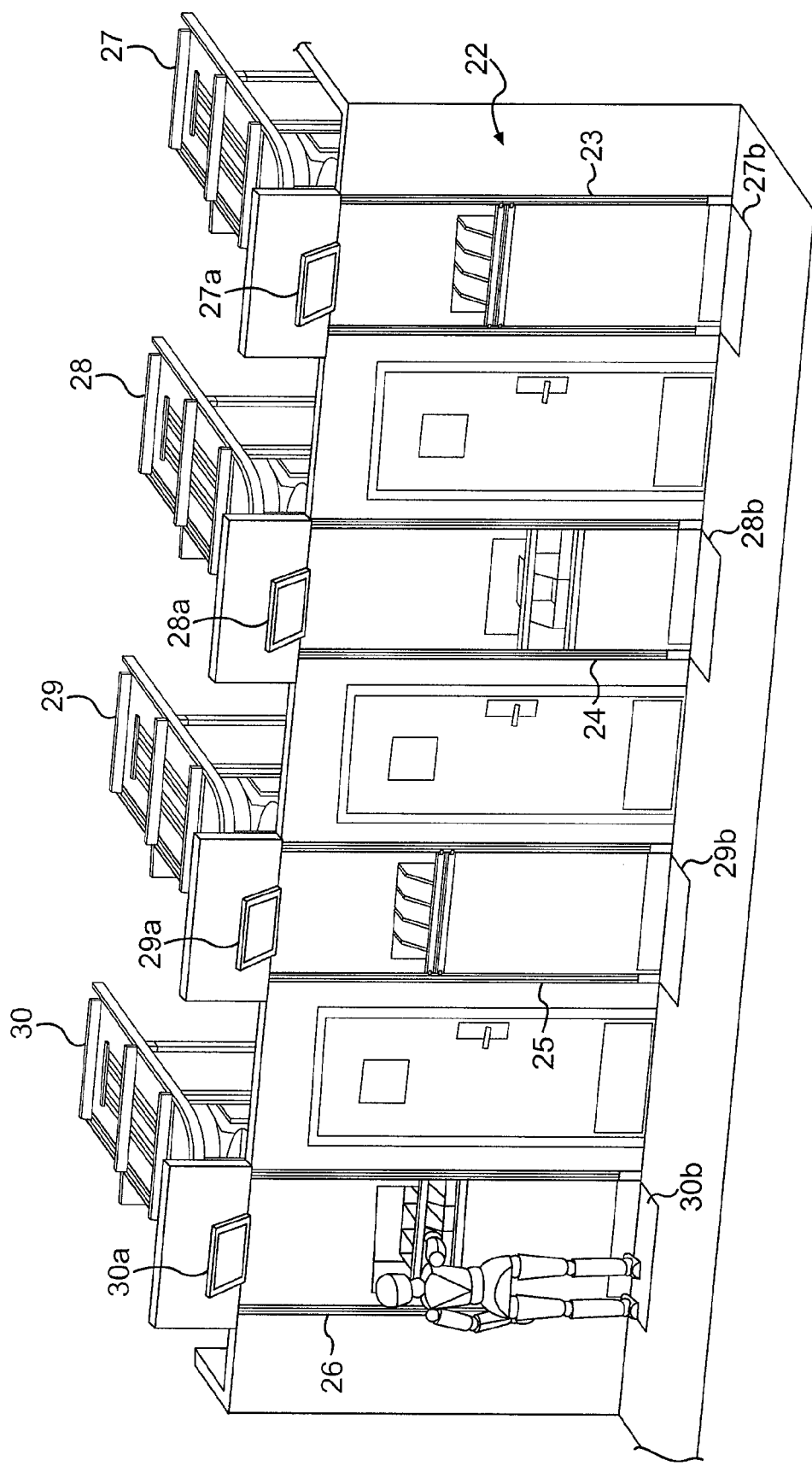
FIG. 3 illustrates an embodiment of an indicator system wall with multiple indicators associated with multiple carousels.

FIG. 3 illustrates an embodiment of the indicator system wall 22 with multiple indicators 23-26 associated with multiple carousels 27-30, respectively. As can be seen, the individual indicators for each carousel are moveable vertically such that each is positionable directly in front of the shelf on the carousel from which the item to be processed is located. Here in FIG. 3 can also be seen flat panel displays 27a-30a which could be used to show pictures of the parts for processing below, and a number of other pertinent data associated with the transaction directive for the operator below. Floor mats 27b-30b are shown as an option which could sense when the operator walks away from the area so that the system automatically confirms the action and closes the access (by bringing both moving bars together—like shown on indicators 23 and 25).

Figure 4:
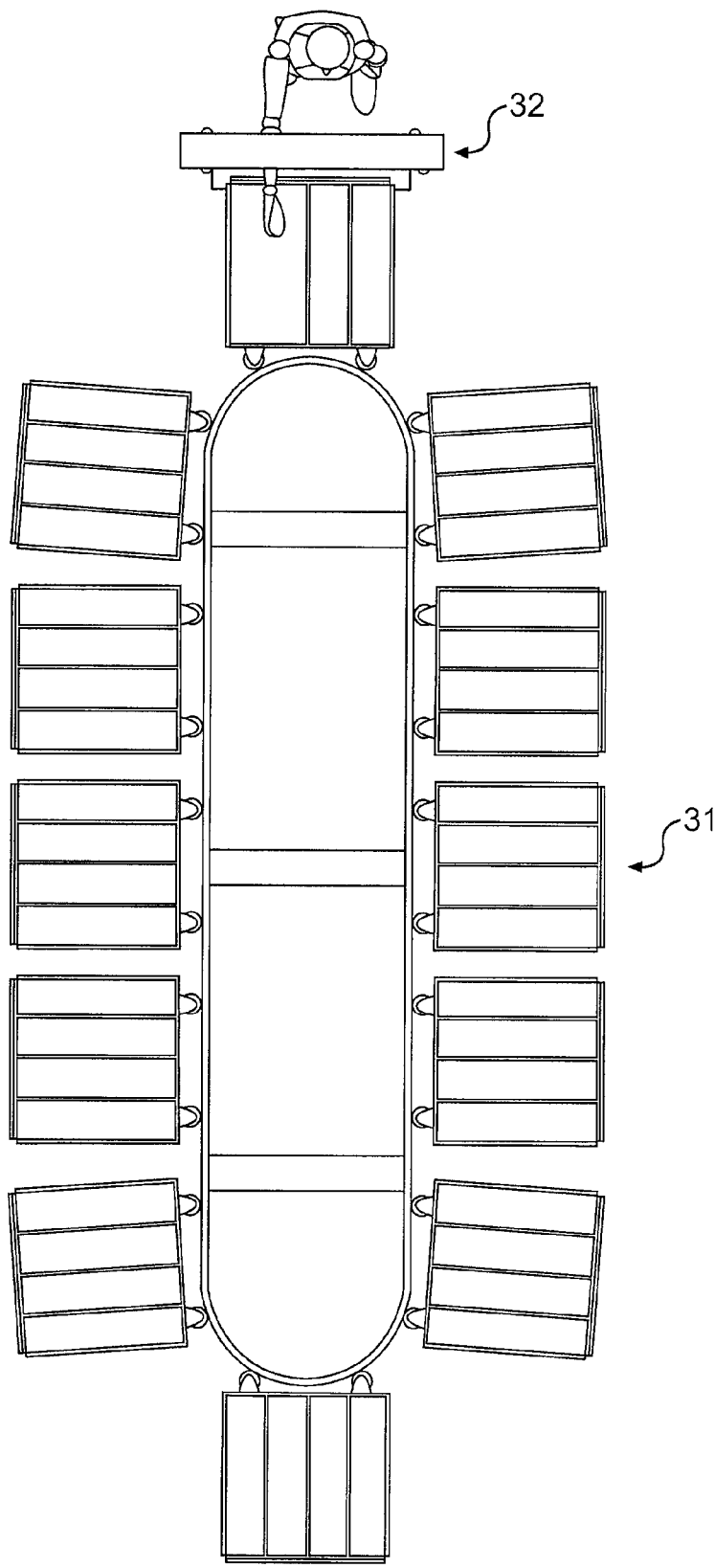
FIG. 4 is a top view of a horizontal carousel with an embodiment of the position indicator system of the present invention positioned directly in front of a vertical row of shelves of the horizontal carousel on which the item to be processed is located.

FIG. 4 is a top view of a horizontal carousel 31 with an embodiment of the position indicator system 32 of the present invention positioned directly in front of the vertical row of shelves of the horizontal carousel on which the item to be processed is located. The embodiment 32 could also easily be placed on the carousel side or anywhere on the radius of the end and still serve the same purpose. Of course, multiple systems 32 are possible on the same carousel to provide several access points for operators.

Figure 5:
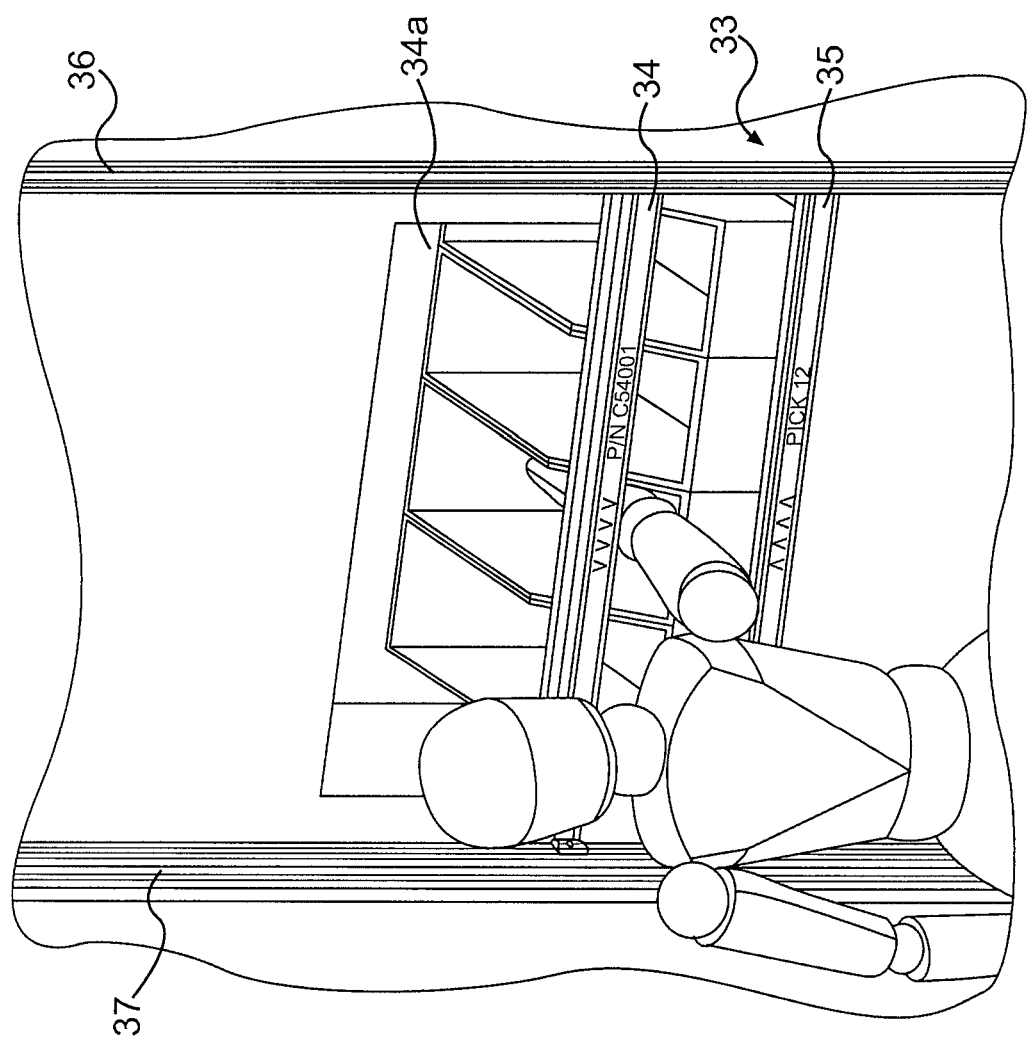
FIG. 5 illustrates an alternative embodiment of the system of the present invention.

FIG. 5 illustrates an embodiment of the present invention. As can be seen, indicator 33 includes upper message bar 34 and lower message bar 35. Message bars 34 and 35 are movable vertically on vertical frame members 36 and 37. As can be seen, bars 34 and 35 are positioned such that the shelf from which the item to be processed is located between the two bars. A flexible (roll-up) see-thru window 34a is shown above message bar 34 for operator visibility into the selected position. Indicator displays on the bars 34 and 35 indicate the position at which the item is located and identification information is also displayed on the message bars. The indicator displays may point in the direction of the shelf on which the item to be processed is located and the identification information may provide information such as part number of the item, transaction quantity, and location. As can be seen, by positioning the indicator directly in front of the item to be processed, the user is able to quickly and easily identify where the item to be processed is located. The lower bar is able to support the weight of a tote that may be slid on to it from the shelf, providing the added benefit of a workstation shelf-like support.

Figure 6:
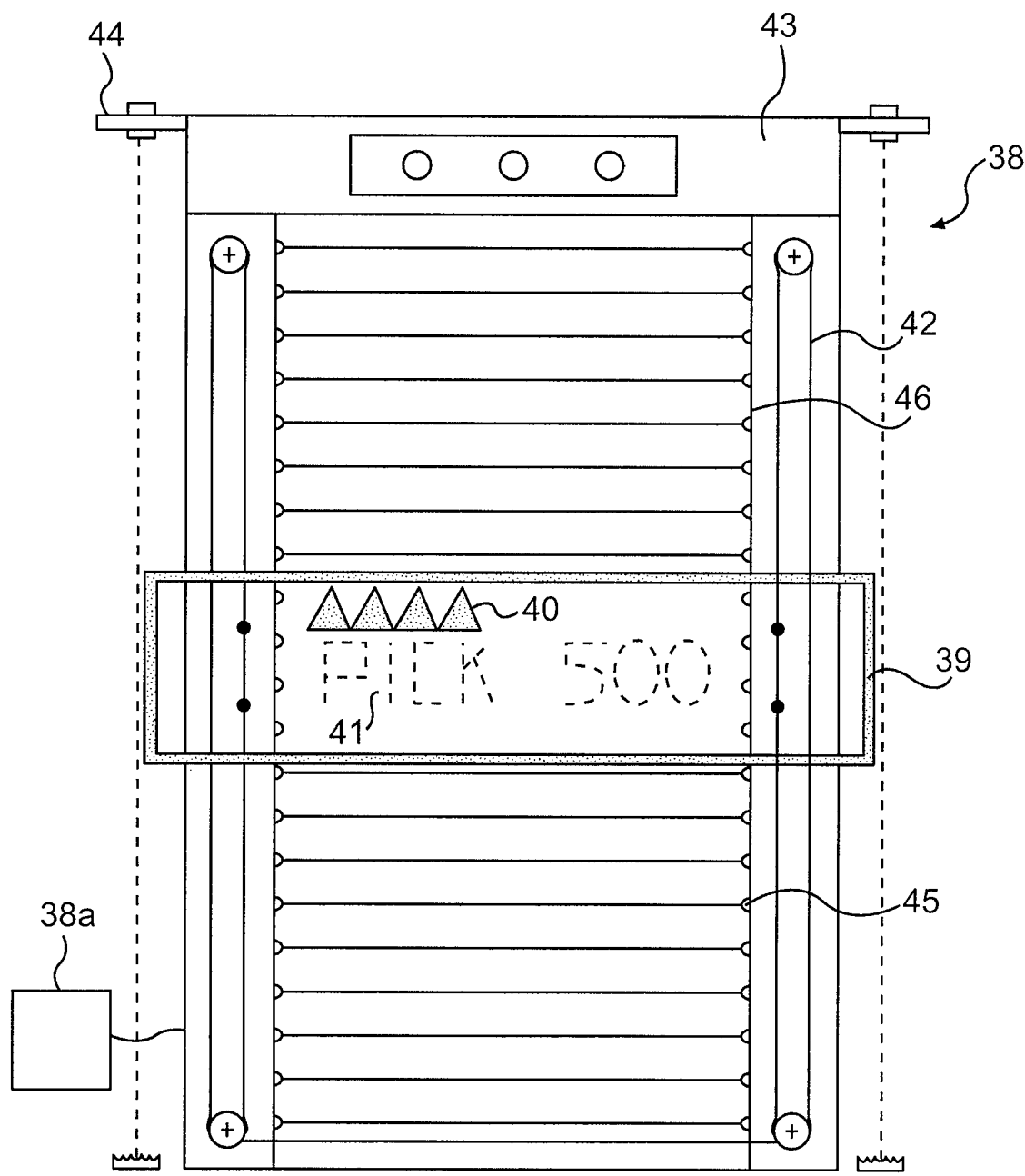
FIG. 6 illustrates another alternative embodiment of the system of the present invention.

FIG. 6 illustrates another embodiment of the present invention. As can be seen, the indicator system 38 includes a vertically movable indicator 39. The indicator 39 includes indicator displays 40 and 41 to identify the location of the item to be processed and to provide information such as process number, process location, item identification information, etc. The vertically movable indicator 39 is movable vertically on a belt drive 42, as one exemplary embodiment. The upper area 43 of the system 38 can also provide information related to the system, such as system status, task ready, etc. The information can be provided by lights. In this embodiment, both vertically aimed photoeyes 44, arranged along a top horizontal frame of the system, and horizontally aimed photoeyes 45, arranged along a vertical frame 46 of the system, are provided. These photoeyes can detect an object in their path on the grid of the photocell beams. Thus, these photoeyes can detect, for example, an obstruction in the path of the vertically moving indicator and access by an arm of the user. This information can be used by the system for a variety of purposes, including stopping the indicator from moving if an obstruction exists and indicating that the user has accessed the system at a particular location to determine either a correct access location or an incorrect access location by the user. A control system 38*a* associated with the grid of photoeyes can control the carousel and/or indicator system, as appropriate, based on information provided by the photoeyes. This control can include, for example, stopping the motion of the indicator, providing a warning alarm, stopping the motion of the carousel, recording access/obstruction location information, etc.

FIGS. 7-22 illustrate alternative embodiments of the present invention. In these embodiments, as discussed previously, the indicator system of the present invention is positioned directly in front of a row of shelves of a carousel system. The carousel system is not illustrated in all of these figures, however, the relationship of the indicator system to the carousel system can be understood from the discussion above.

Figure 7:
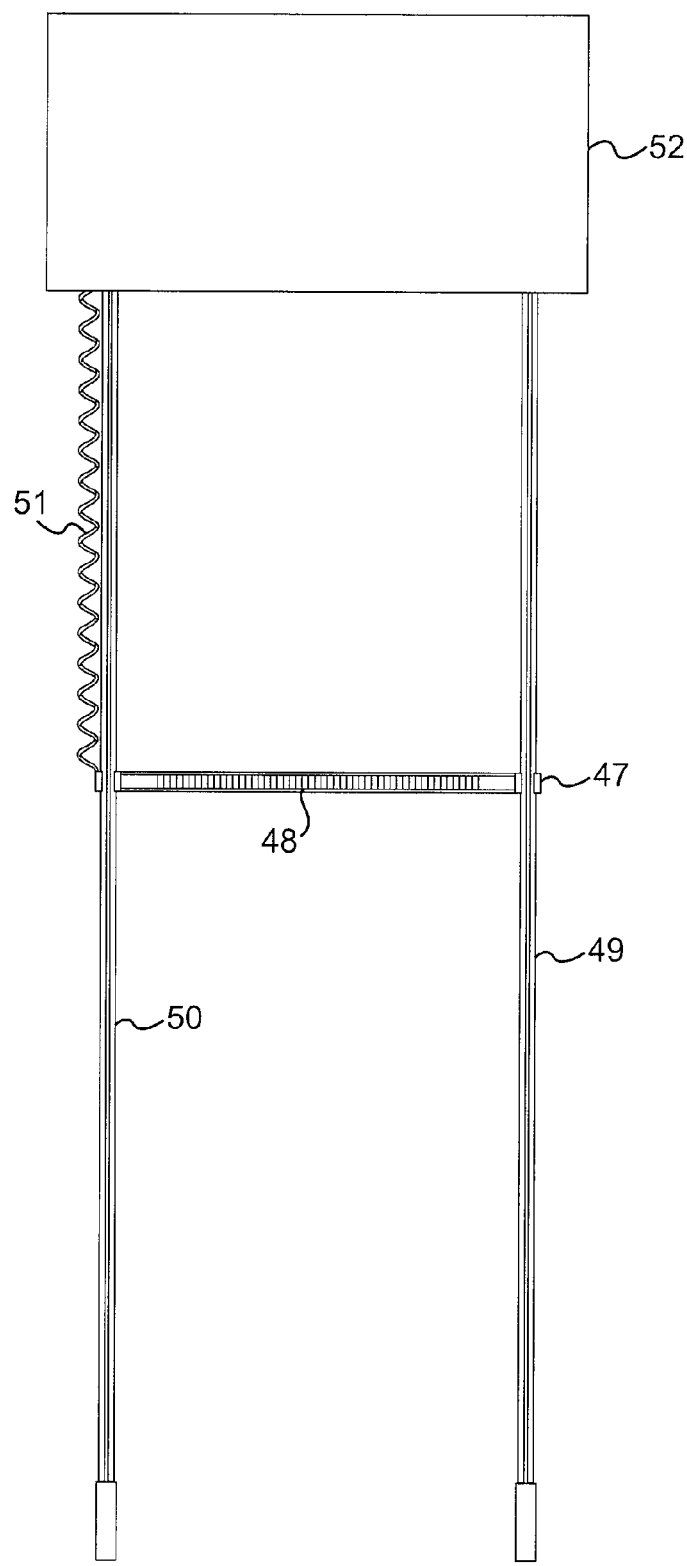
FIG. 7 illustrates an embodiment of an indicator that includes a single message indicator bar.

FIG. 7 illustrates an indicator that includes a single message indicator bar 47. A message display strip 48 is provided on the indicator bar which indicates a particular location relative to the bar where the item to be processed is located on the shelf behind. As discussed previously, additional lighting may be provided on the bar to provide identification information, etc. The bar 47 can be positioned either directly in front of, above, or below the item to be processed. In either case, the bar is in front of the item to be processed. The bar 47 is movable vertically on frame members 49 and 50 such that it is positionable directly in front of the shelf on which the item to be processed is located. Power and data for the message display 48 may be supplied to bar 47 by cord 51. The cord is only one means to accomplish this. Other ways could include wireless transmission to the bar containing message information and battery power on the bar 47. The battery could be re-charged by delivering the bar to a "charge" point somewhere along the structure 49 and 50, or by a continuous strip bus rail and brush contacts along the vertical path. A display area 52 may be provided on an upper area of the system, and this area can also be used for the control elements (motors, etc.) of the indicator system.

With respect to FIGS. 8-22, the same reference numerals will be used for similar components in the various embodiments and common components will not be described for each embodiment.

Figure 8:
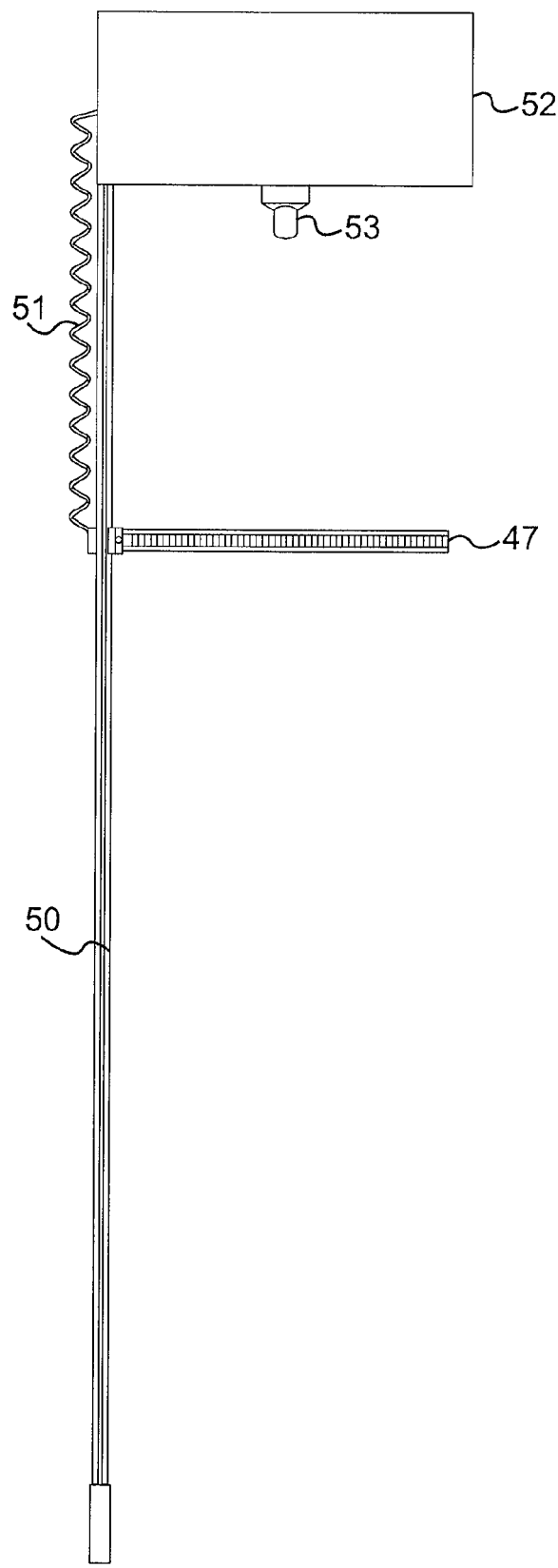
FIG. 8 illustrates an embodiment of the present invention with a single vertically-extending frame member.

FIG. 8 illustrates an embodiment with a single vertically-extending frame member 50. Indicator bar 47 is movable vertically on frame member 50. Task indication 53 can be provided on upper area 52.

Figure 9:
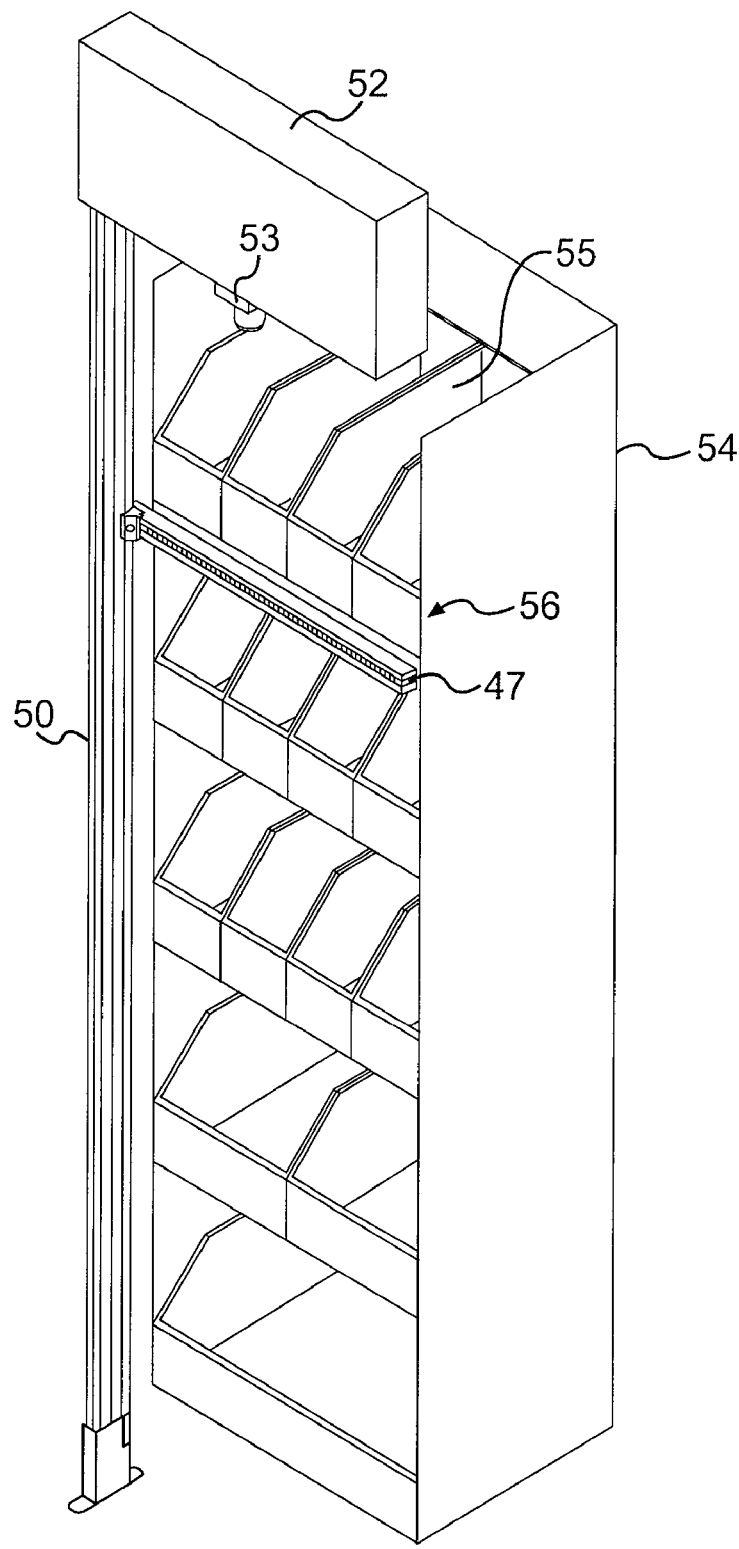
FIG. 9 illustrates the embodiment of FIG. 8 as positioned in front of a carrier system.

FIG. 9 illustrates the embodiment of FIG. 8 as positioned in front of a carrier system 54. As can be seen, indicator bar 47 has been moved vertically on frame member 50 such that it is positioned directly in front of the row of bins in which the item to be processed is located. For example, if the item to be processed was located in bin 55 of shelf 56, the indicator displays on bar 47 directly in front of bin 55 would illuminate.

Figure 10:
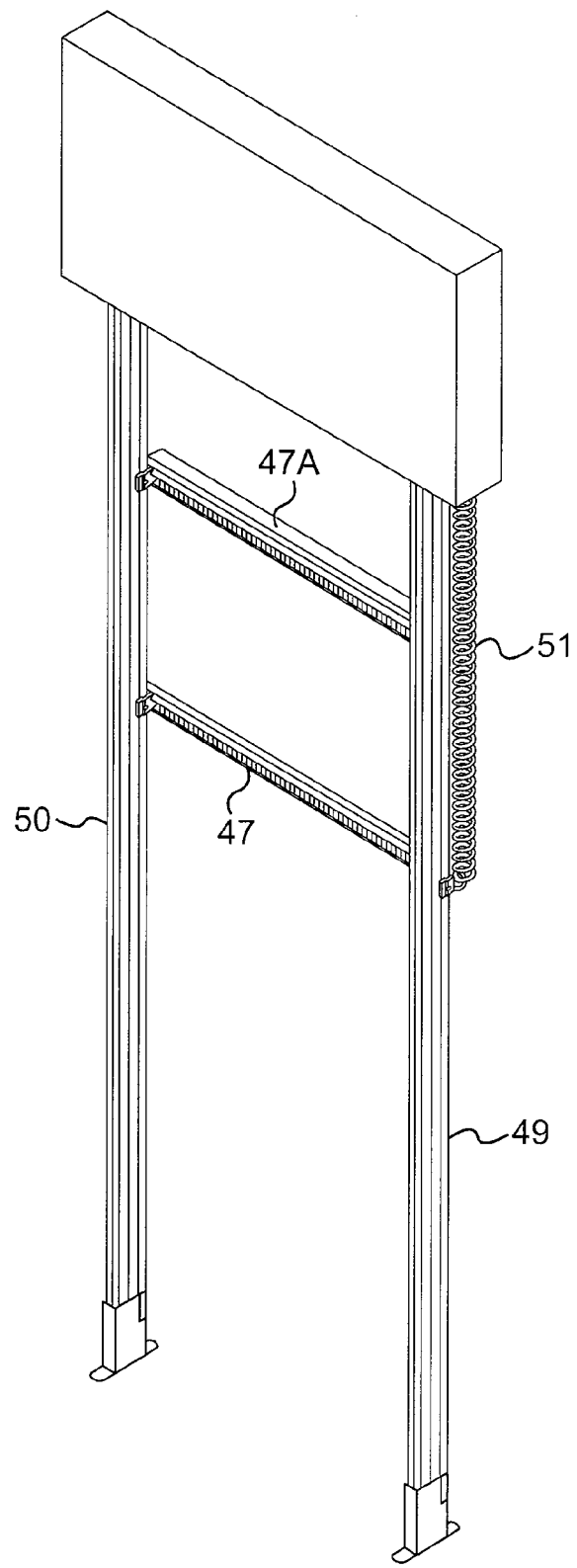
FIG. 10 illustrates an embodiment of the present invention that includes two indicator bars.

FIG. 10 illustrates an embodiment that includes two indicator bars 47 and 47A. As discussed previously, these bars are movable vertically on frame members 49 and 50 and the bars are positioned both above and below the shelf of interest. Indicator displays, as described above, can be provided on each of the bars such that the position of the item to be processed can be indicated from a position both above and below the location. Alternatively, location and transaction information can be provided on one bar and identification information can be provided on the other bar.

Figure 11:
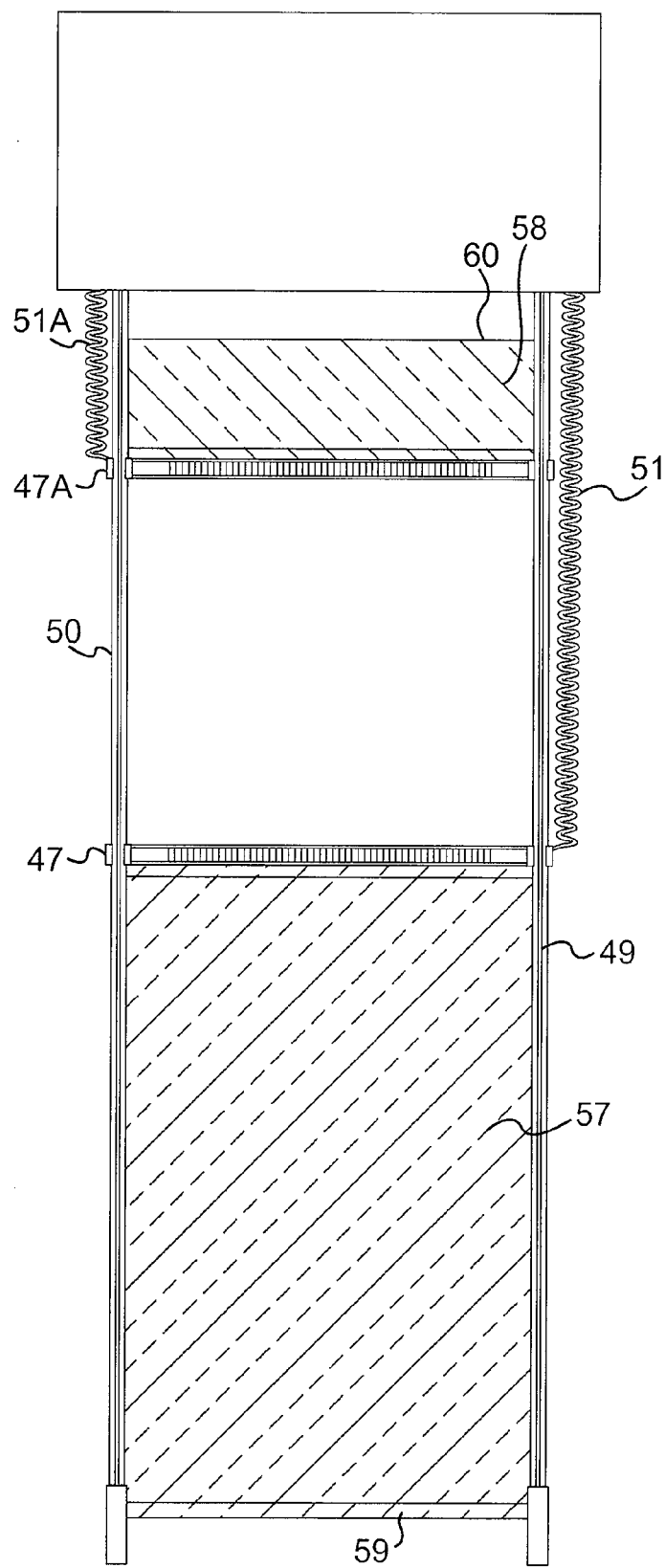
FIG. 11 illustrates the embodiment of FIG. 10 with covers being provided.

FIG. 11 illustrates the embodiment of FIG. 10 with covers 57 and 58 being provided. As discussed previously, the indicator bars 47 and 47A are positioned above and below the shelf on which the item to be processed is located. Thus, access is provided to this shelf by the indicator system through the bars 47 and 47A. Covers 57 and 58 restrict access to the other shelves of the carrier system which do not contain the item to be processed, and block the carousel from the operator for safer operation. As can be understood, as bar 47 is vertically moved up or down, the cover 57 is adjusted correspondingly to cover that area of the indicator system that is located below bar 47. Similarly, as bar 47A is moved up or down, cover 58 is adjusted correspondingly to cover that area of the indicator system that is located above bar 47A. Covers 57 and 58 can be included on rollers associated with the respective bars and respective frame members 59 and 60 of the indicator system. Separate power cords 51 and 51A can be provided for each indicator bar.

Figure 12:
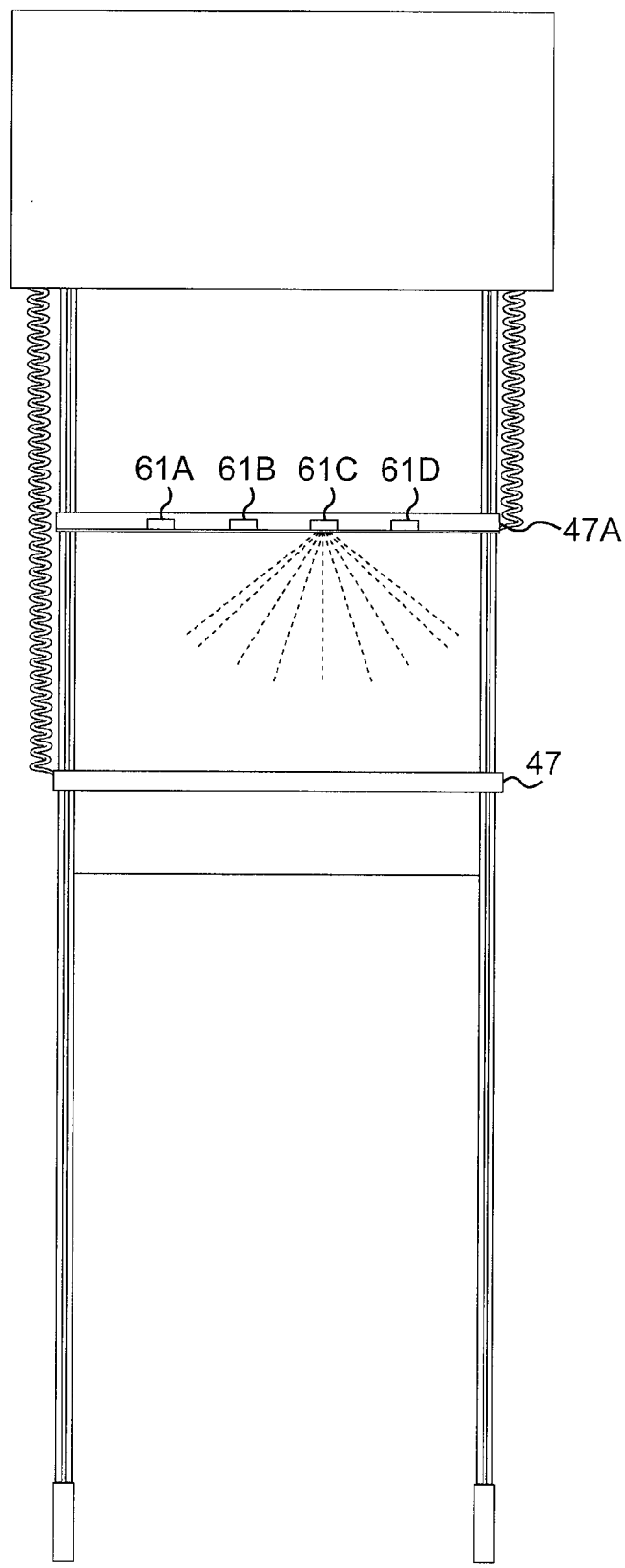
FIG. 12 illustrates the embodiment of FIG. 11 with task lights being provided on the indicator bar.

FIG. 12 illustrates the embodiment of FIG. 11 with task lights 61A-61D being provided on indicator bar 47A. These task lights can be provided in addition to the indicator displays, and information lights, that may also be provided on indicator bar 47A. Whereas not shown, the task lights, indicator lights, and information lights can also be provided on bar 47.

Figure 13:
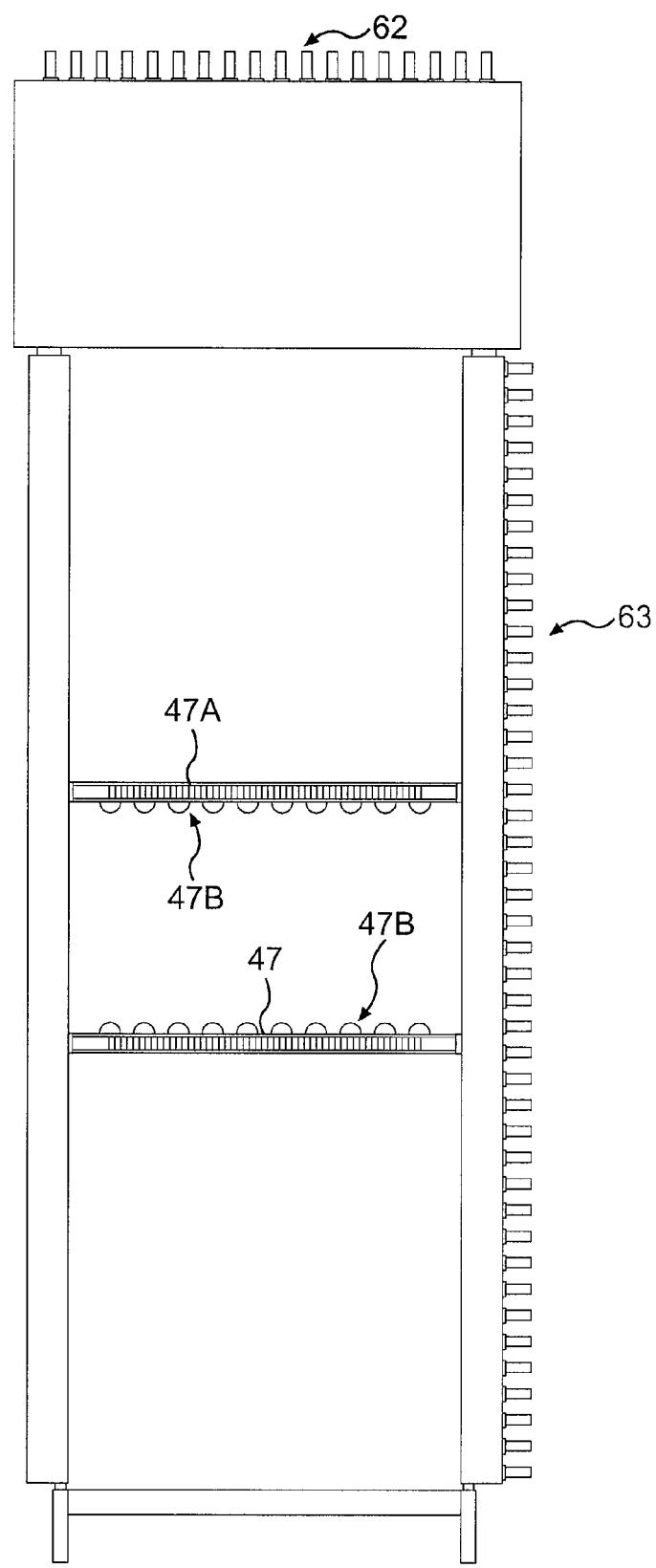
FIG. 13 illustrates the embodiment of FIG. 12 with a row of photocells provided horizontally on a top of the indicator system and a row of photocells provided vertically on one of the frame members of the indicator system.

FIG. 13 illustrates the embodiment of FIG. 12 with a row of photocells 62 provided horizontally on a top of the indicator system and a row of photocells 63 provided vertically on one of the frame members of the indicator system. As discussed previously, the individual photocells in each row can detect movement in the illumination path associated with each photocell. Thus, the x and y position of an object in the illumination paths can be determined. This position of the object, and more generally, the presence of the object in the illumination paths can be used for a variety of purposes, including determining a correct or incorrect access into the system by a user and detecting an obstruction in a movement path of the indicator. In addition, bars 47 and/or 47A may contain RFiD reader antennas 47B. Thus, each item to be processed can contain an RFiD tag. When the tagged item is removed from the shelf, the tag can be read by the RFiD sensors and information related to the item may be obtained in this manner. A single antenna may also be employed, depending on the range between reader and tag, the type of tag (passive or active), and requirements of any particular application. This information includes, among other items, an identification of the item and the fact that the item was removed from, or added to, the storage bin. Additionally, the RFiD sensors may be used to conduct automatic inventory of all of the items stored in the storage system without removing the items. The bars scan the shelves behind, by moving them, over the entire front of the storage system. In this manner, the item tags can then be read by the sensors. The carousel would then sequence to the next carrier, and the process would be repeated to scan the next carrier of product. For efficiency, the bars would be driven up for the first carrier, the carousel moved to the second carrier, then the bars driven down, and so on in this manner.

Figure 14:
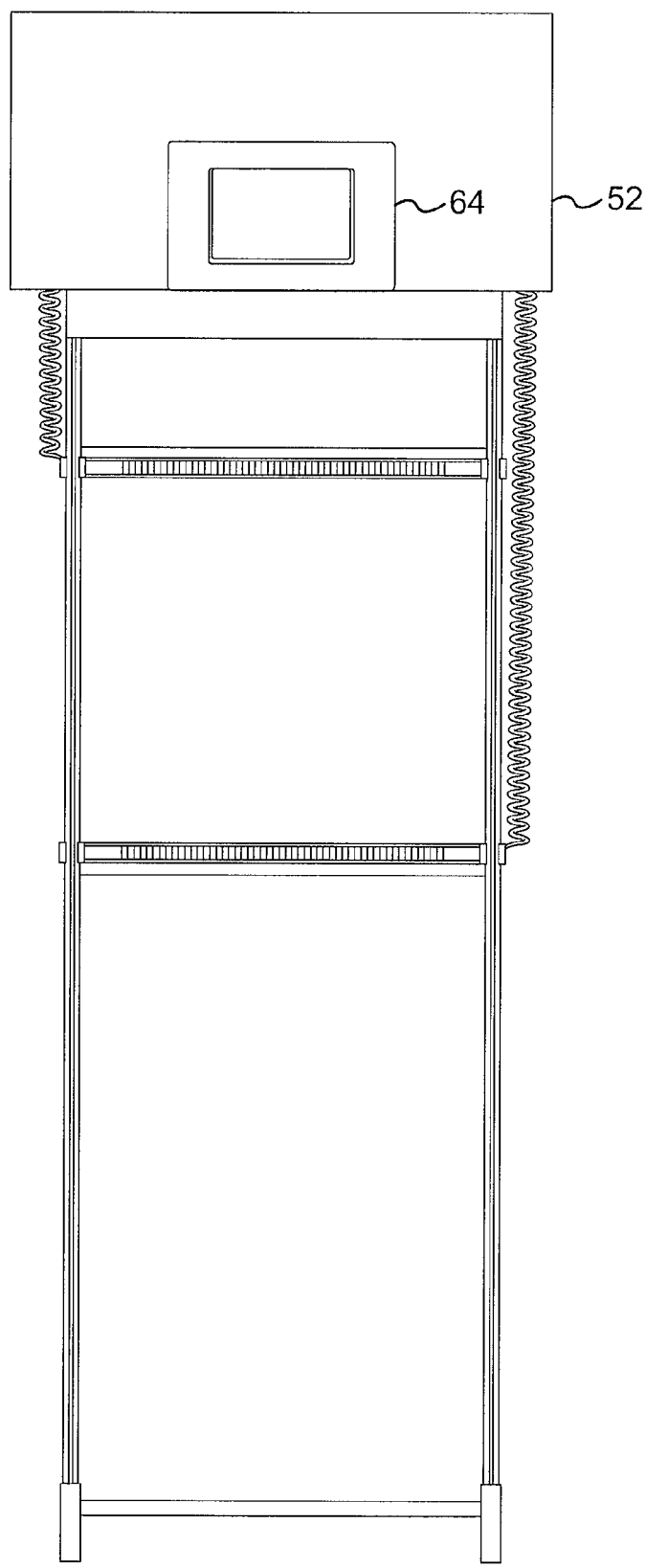
FIG. 14 illustrates that a monitor may be included in the display area of the upper area of the indicator system.

FIG. 14 illustrates that a monitor 64 may be included in the display area 52 of the upper area of the indicator system. This monitor may be any of a variety of display devices and may be a flat panel display screen. The display can provide any of a variety of information, including pictures or drawings of the particular part that is selected for processing, transaction quantity, and other processing directives for the operator.

Figure 15:
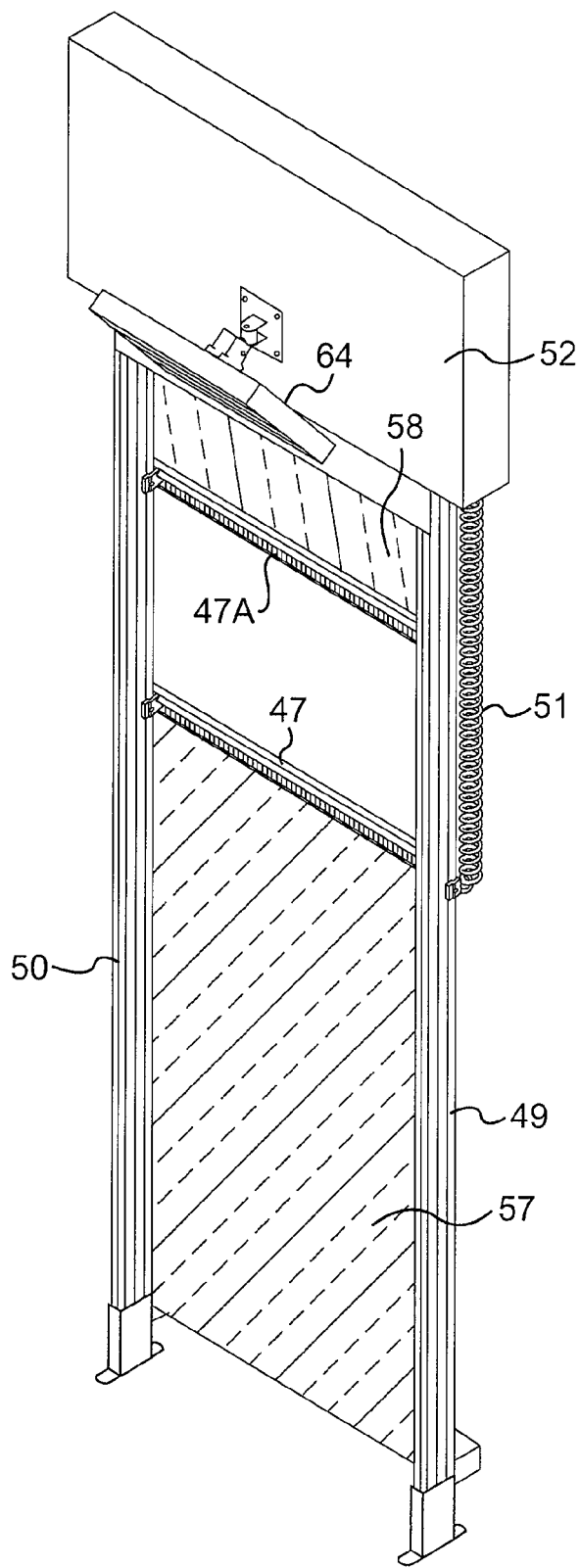
FIG. 15 is a perspective view of an embodiment of the indicator system with a display that is adjustable on the upper area of the system.

FIG. 15 is a perspective view of an embodiment of the indicator system with a display 64 that is adjustable on the upper area of the system. Thus, because the display is provided at a height that may be too high for a viewer to optimally see if the display is flush with the display area 52, the display 64 can be rotated on a joint to face in a downward direction. This provides for better viewing by the worker below.

Figure 16:
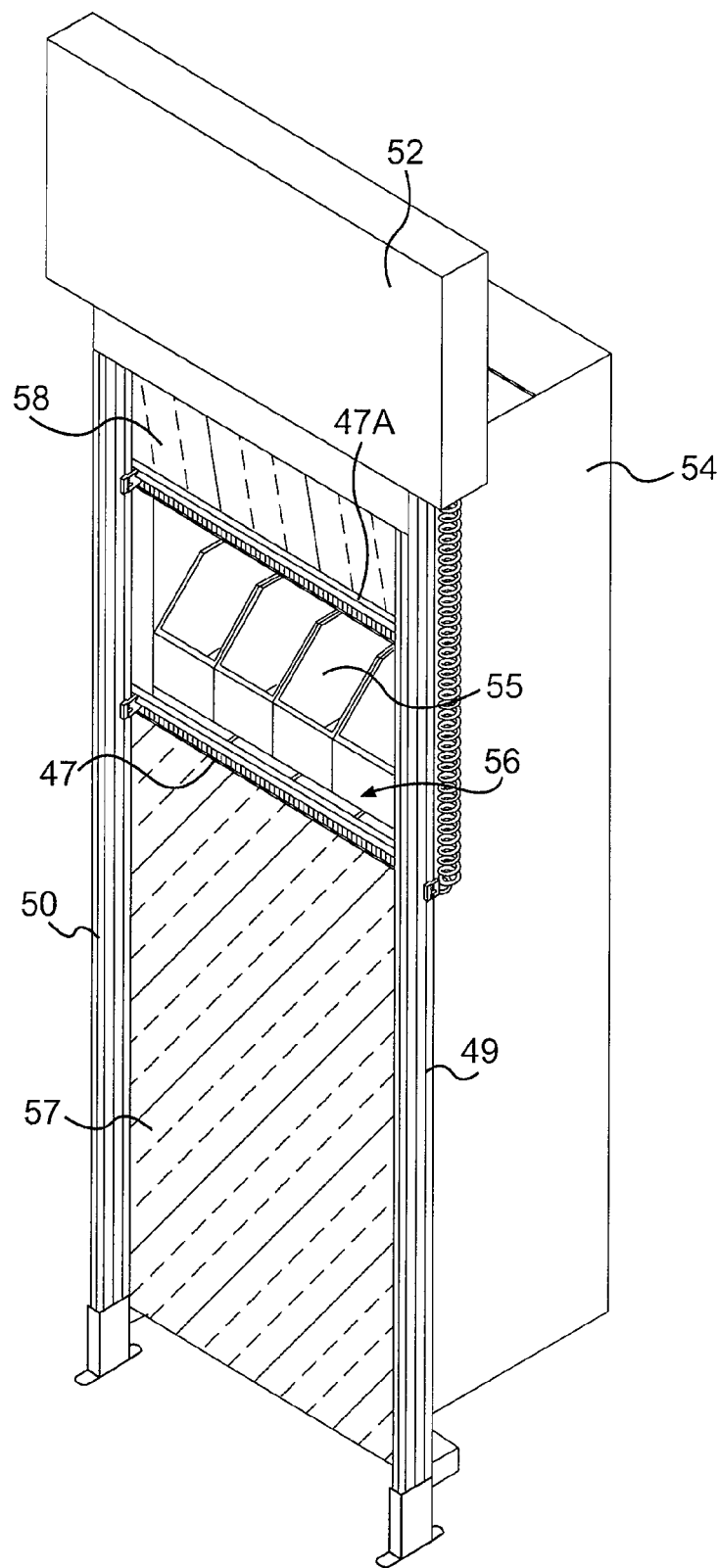
FIG. 16 illustrates an embodiment of the indicator system as positioned in front of a carrier from a rotating horizontal carousel system.

FIG. 16 illustrates an embodiment of the indicator system as positioned in front of a carrier 54 from a rotating horizontal carousel system. As can be seen, indicator bars 47 and 47A have been moved vertically on frame members 49 and 50 such that they are positioned above and below the row of bins on which the item to be processed is located. For example, if the item to be processed was located in bin 55 of shelf 56, the indicator displays on bar 47 and/or 47A directly below and above, respectively, bin 55 would be clearly designated. Covers 57 and 58 cover the rows of bins in which the item to be processed is not contained.

Figure 17:
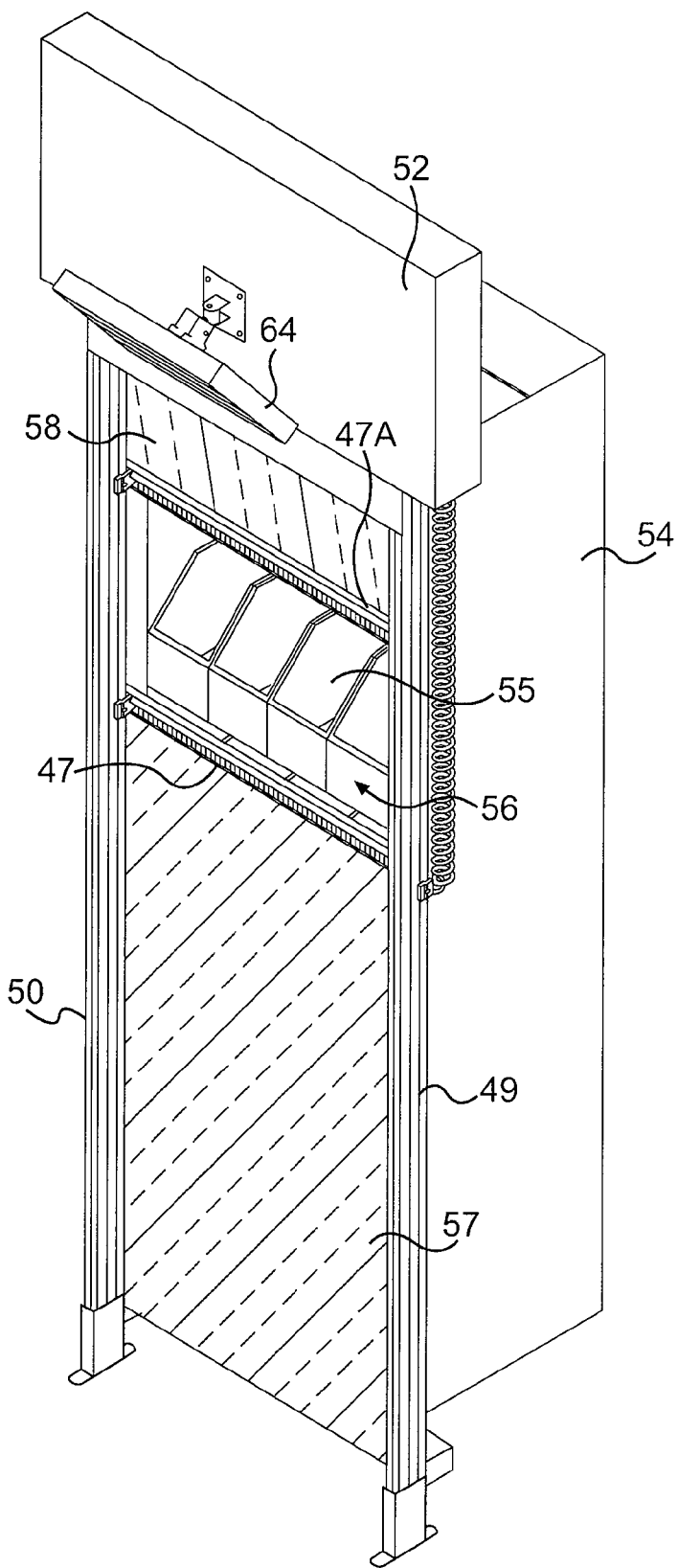
FIG. 17 illustrates the embodiment of FIG. 16 with a positionable display.
Figure 18:
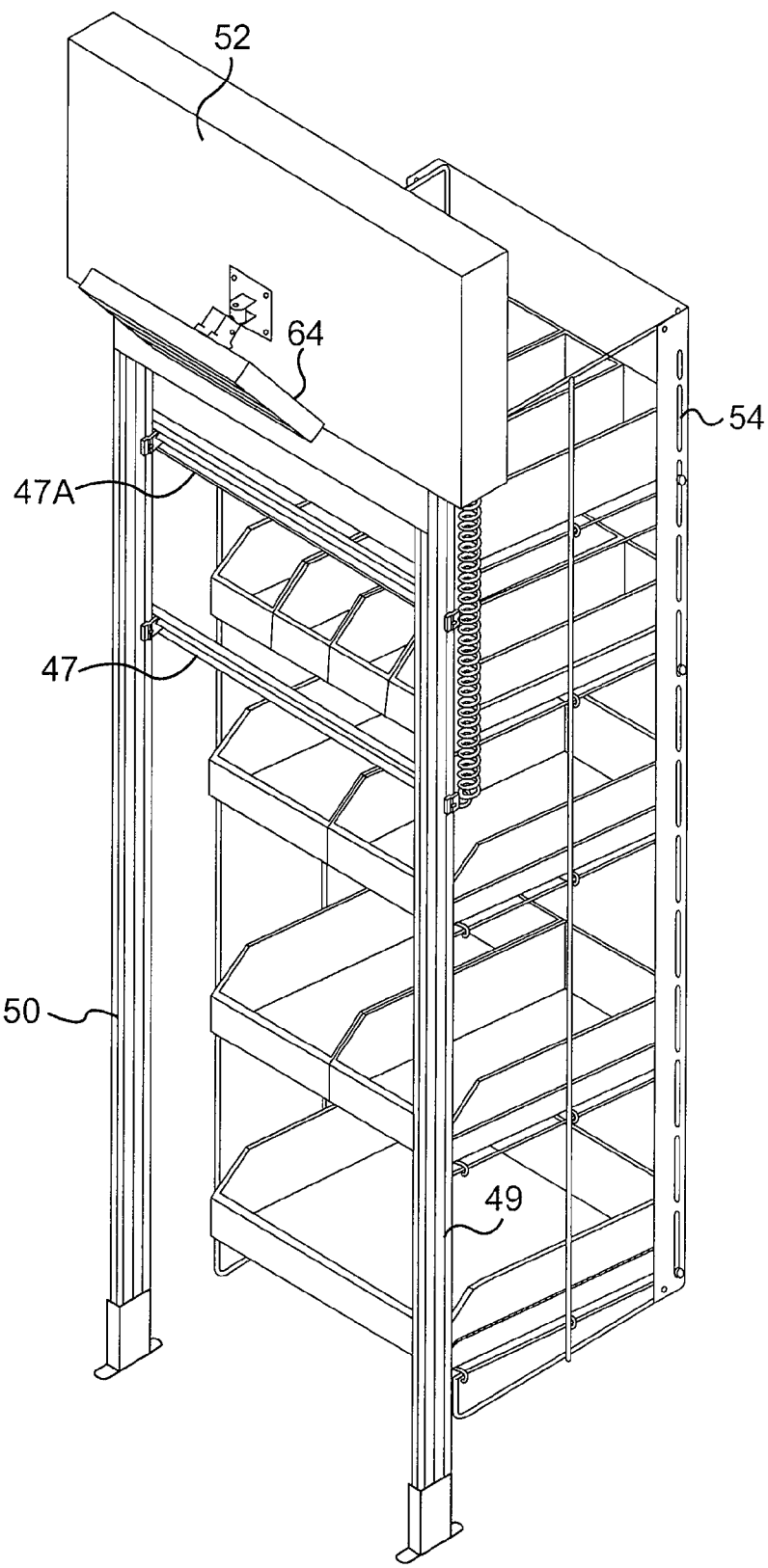
FIG. 18 illustrates the embodiment of FIG. 17 but without carrier side covers.

FIG. 17 illustrates the embodiment of FIG. 16 with a positionable display 64 and FIG. 18 illustrates the embodiment of FIG. 17 but without the carrier side covers.

Figure 19:
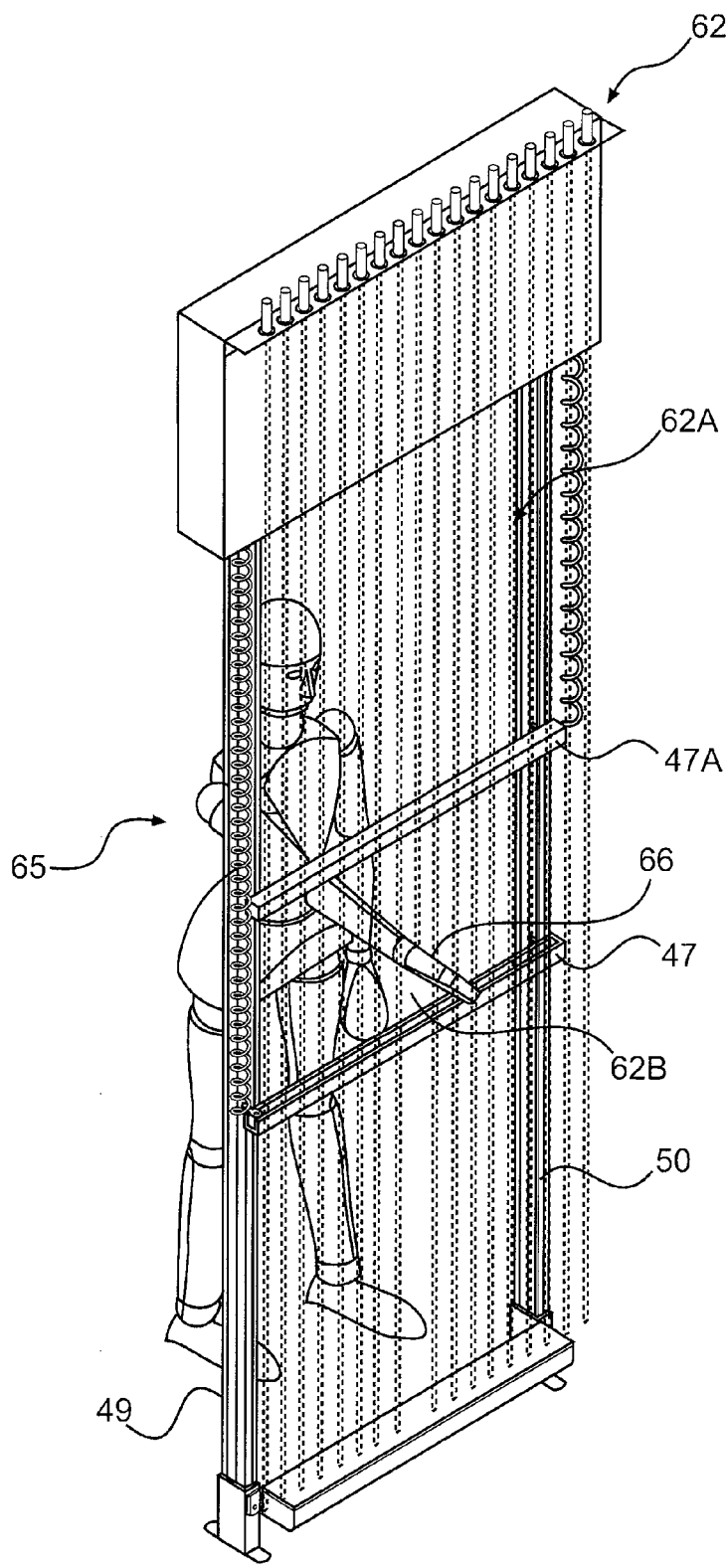
FIGS. 19-21 illustrate the embodiment of FIG. 13 with a representation of the illumination paths of the photoeyes with FIG. 19 being a rear view, FIG. 20 being a front view, and FIG. 21 being a perspective front view.
Figure 20:
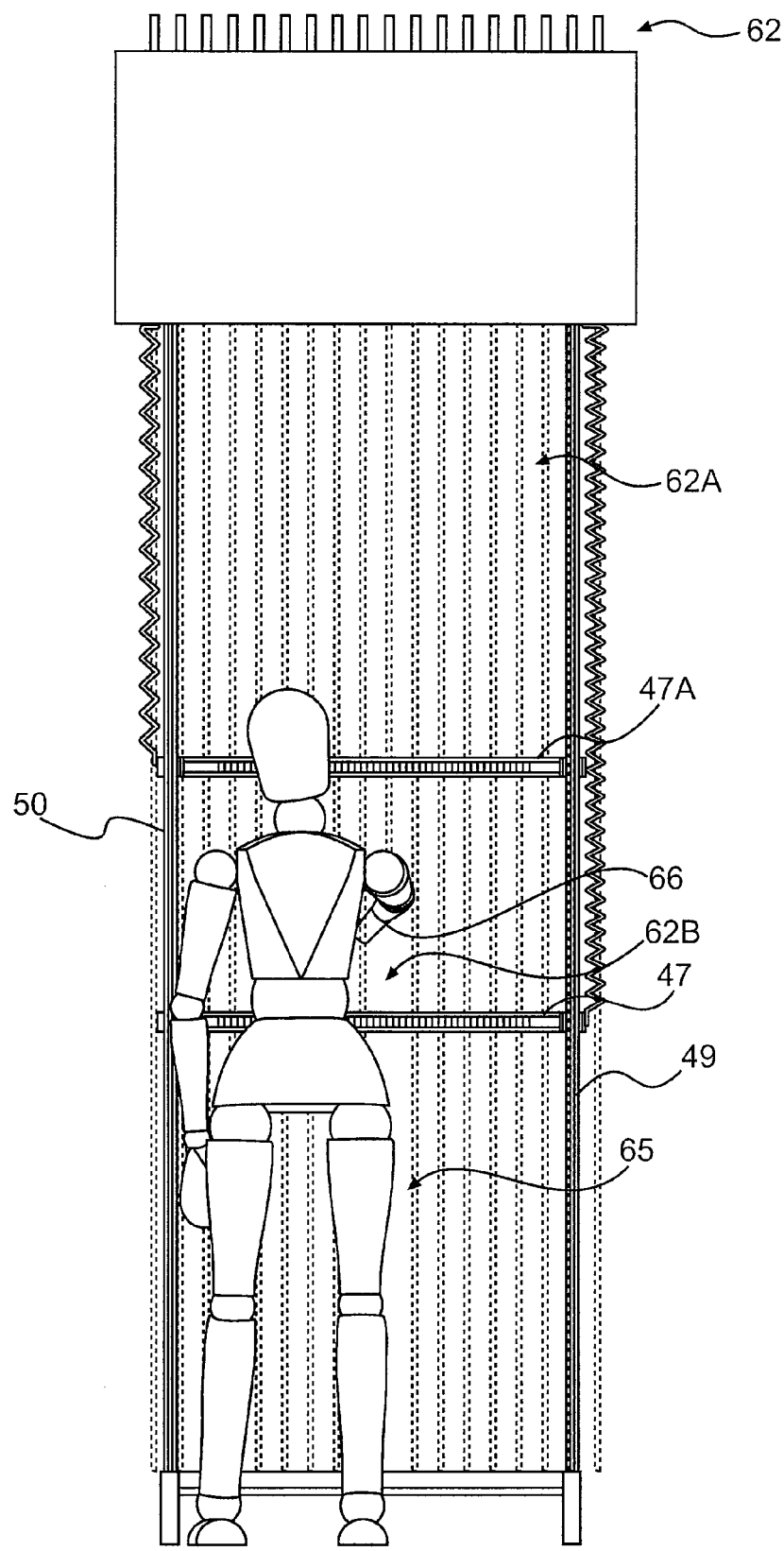
Figure 21:
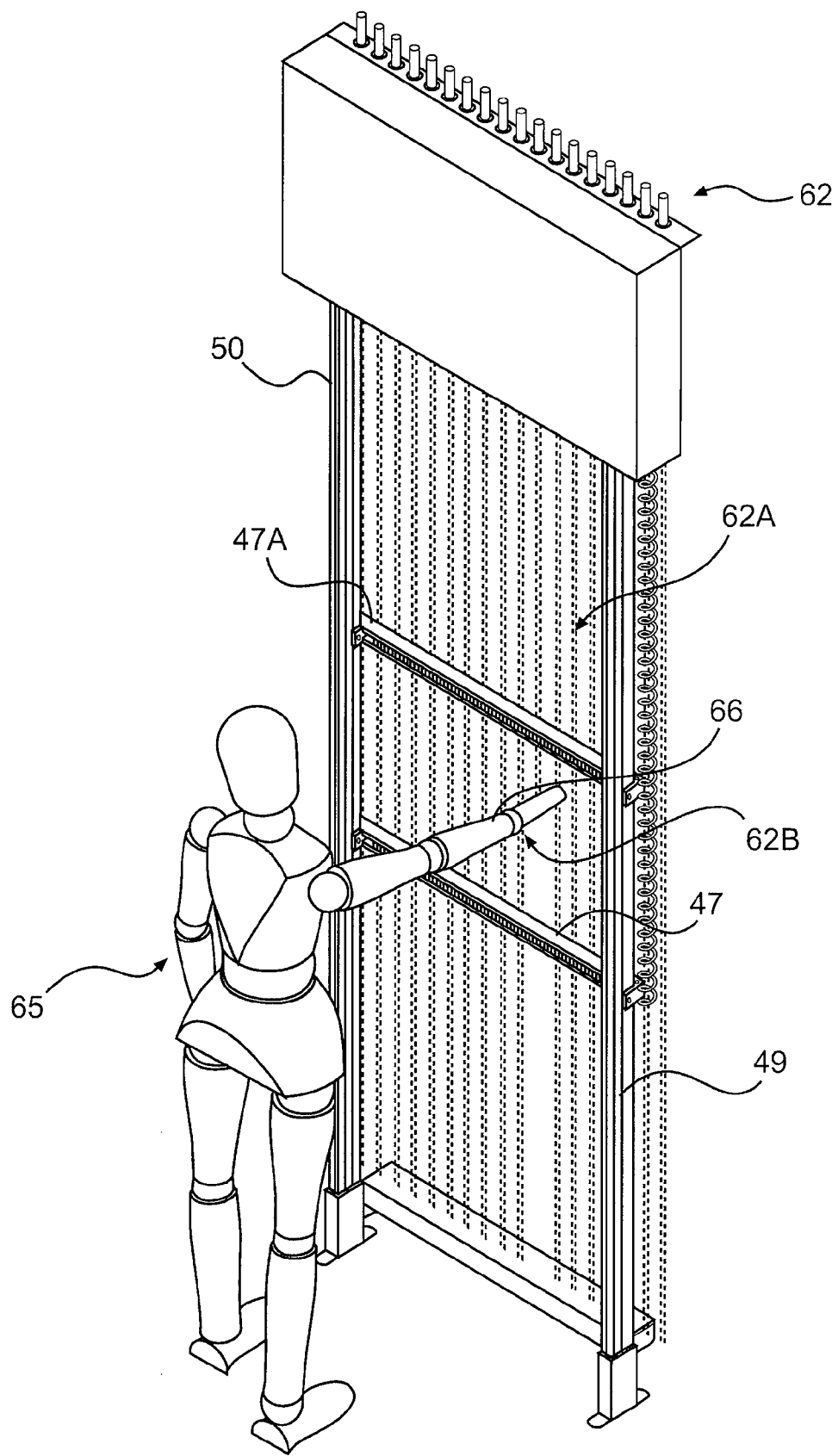

FIGS. 19-21 illustrate the embodiment of FIG. 13 with a representation of the illumination paths of photoeyes 62. As illustrated, the illumination paths 62A run vertically from each photoeye 62. When the user 65 inserts their arm 66 through the access opening defined by indicator bars 47 and 47A, the illumination path(s) for the photoeyes 62 at this location 62B are interrupted. Thus, the system is able to determine that an object, which in this example is the arm of the processor, has been inserted into the defined access area. Of course, although not illustrated in these figures, as discussed previously, photoeyes could also be included horizontally in a column on frames 49 and/or 50. In this manner, both the x and y position of the user's arm could be determined.

Figure 22:
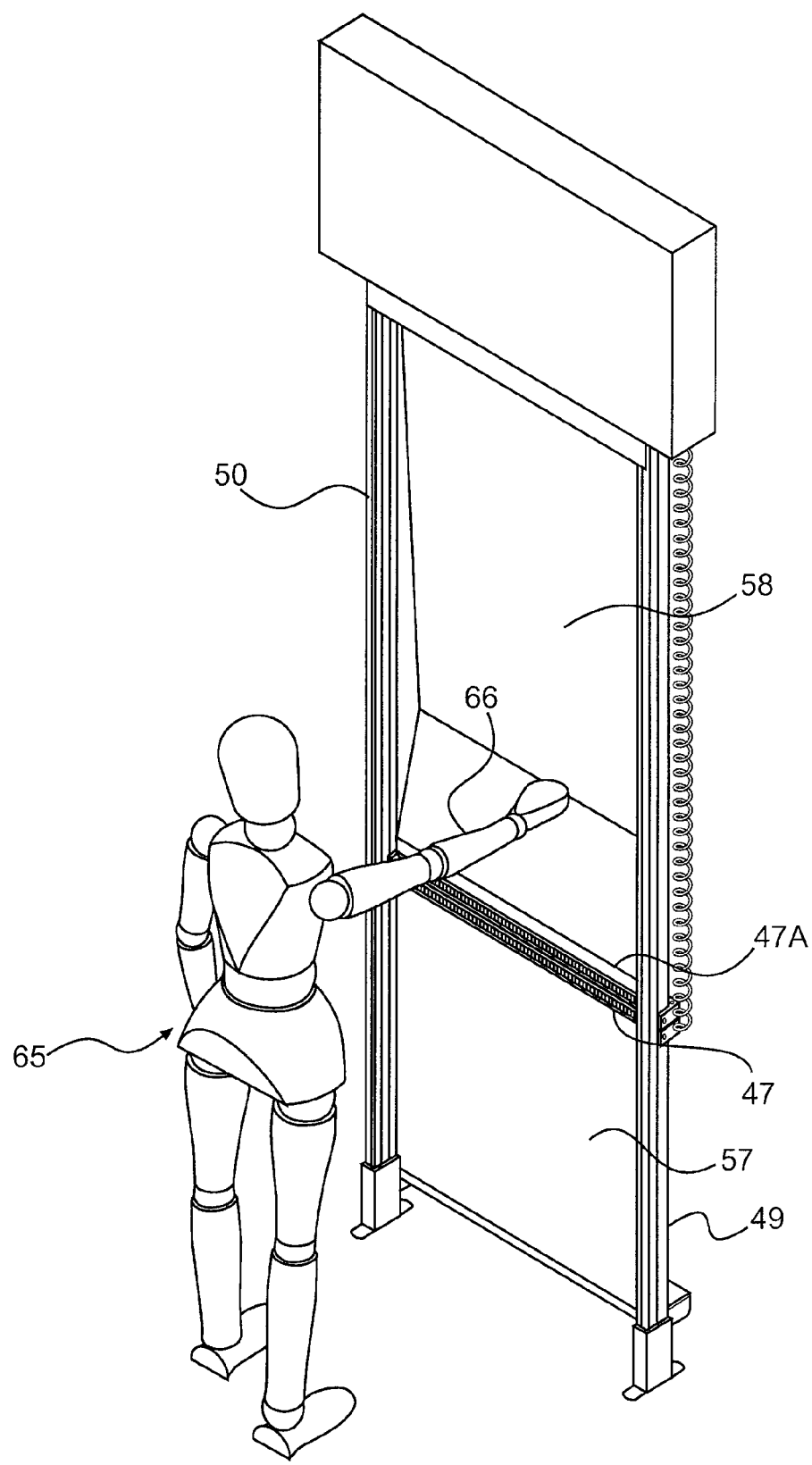
FIG. 22 illustrates an embodiment of the indicator system with covers.

FIG. 22 illustrates an embodiment of the indicator system with covers 57 and 58. As can be seen, when the user 65 attempts to position their arm 66 through an area of the indicator system that is obscured by the covers, the cover impedes movement of the arm through the system, and causes an interruption of vertically placed photocell beams (previously described) behind, which causes a stop of carousel rotation and can include recording the violation. In this example, the user 65 is trying to position their arm through the area covered by cover 58 and, thus, cover 58 blocks the user's arm from extending through the indicator system and into the carousel system. This can provide advantages, such as, preventing access into an area of the carrier system that the user is not authorized to access and/or preventing the wrong item from being processed, and additional safety between the operator and the moving carousel mechanism.

Figure 23:
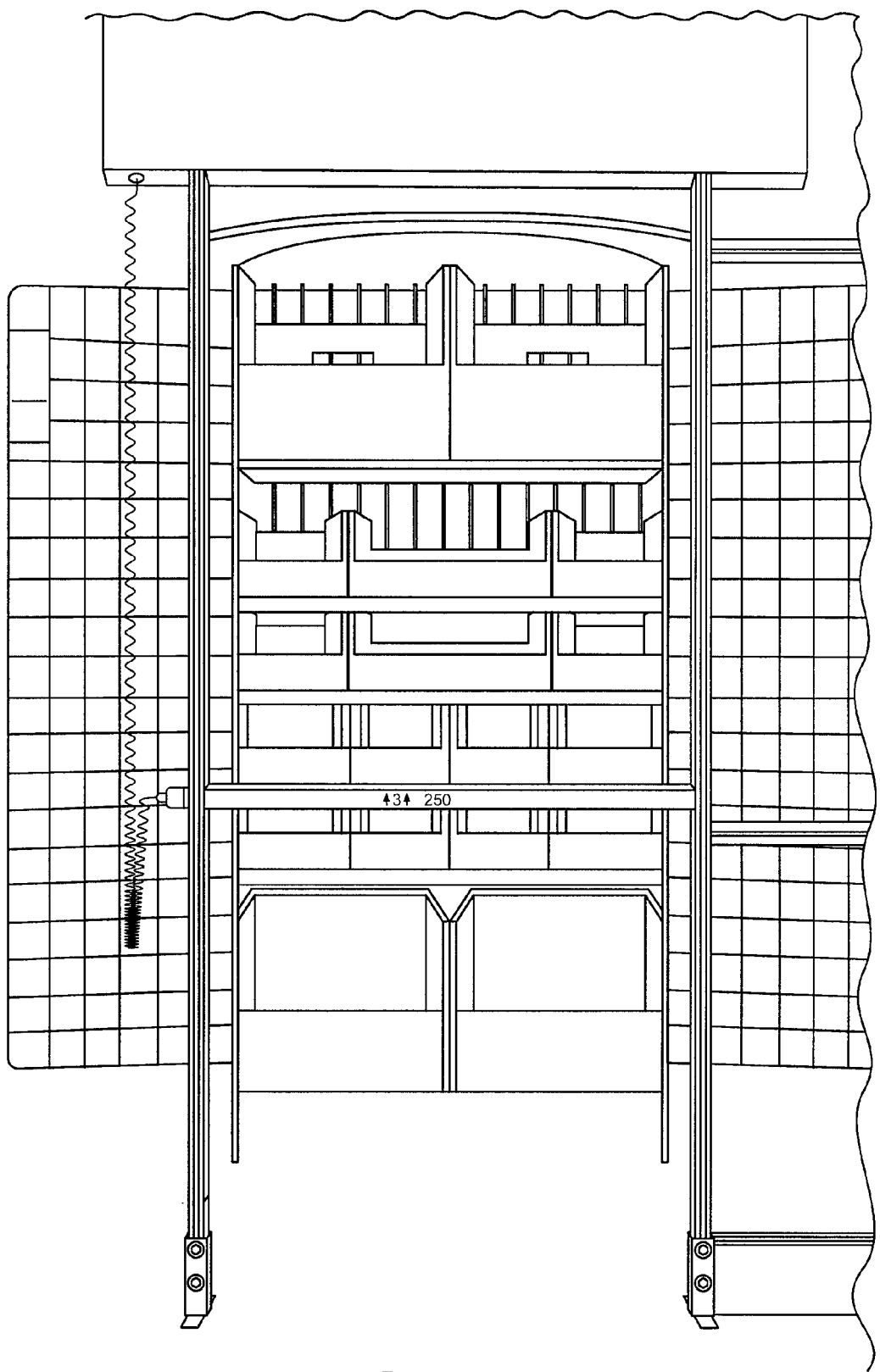
FIGS. 23 and 24 illustrate a further embodiment of the indicator system of the present invention.
Figure 24:
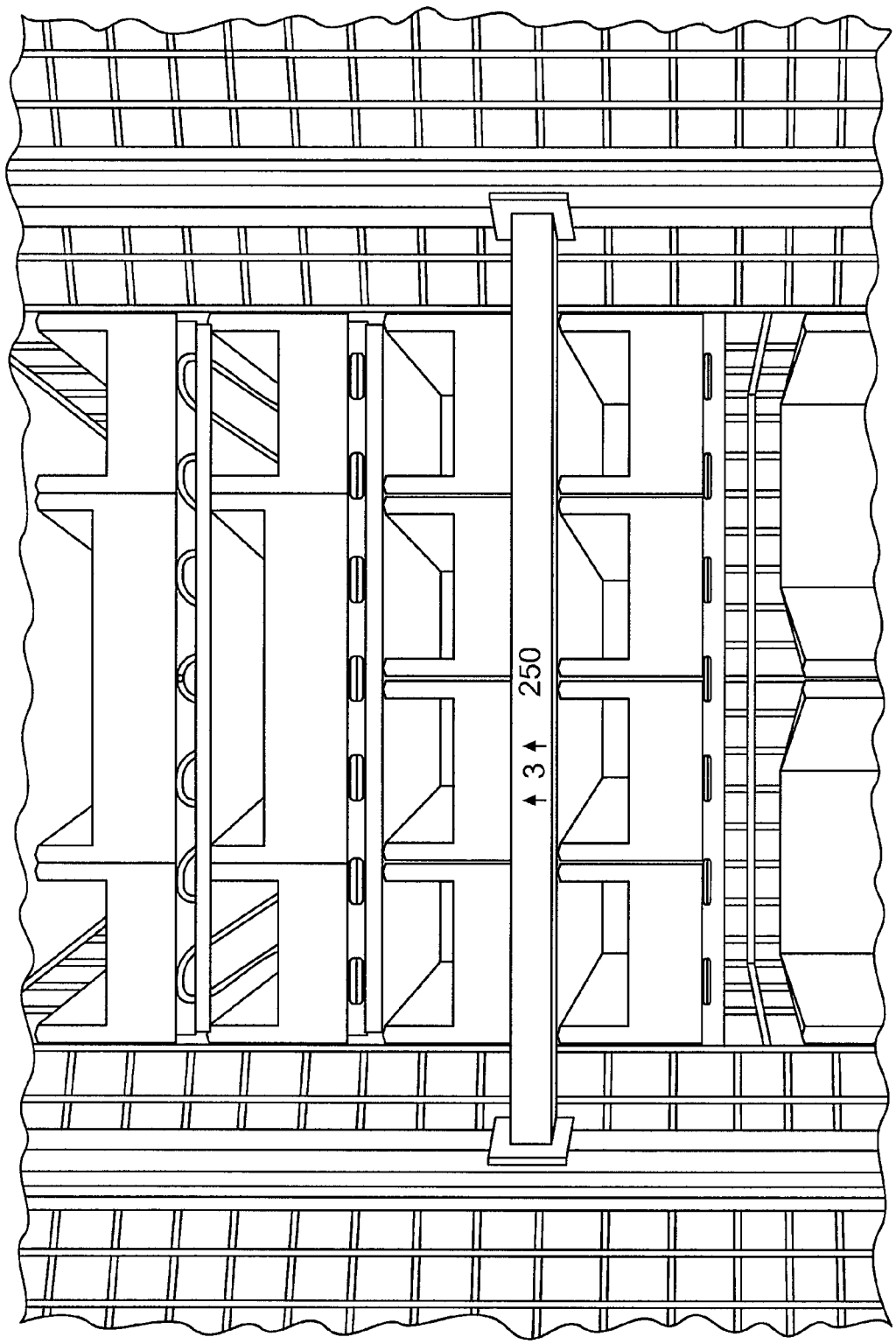

FIG. 23 illustrates an embodiment of the indicator system of the present invention. As can be seen, one indicator bar is movable vertically on two vertically extending support frames. The indicator bar is therefore vertically movable such that it is positionable direct in front of the shelf on which the item to be processed is located. The indicator bar includes message displays that indicate the process location and provide additional information. As can be seen in FIGS. 23 and 24, the indicator bar indicates the tote that contains the item to be processed by the up arrows. The bar also designates, in this example, that the tote depth level (3rd compartment in storage container) for processing is "3" and the transaction quantity is "250". Of course, if the tote was located below the indicator bar, the arrows would point downward to the relevant tote.

Whereas the present invention has been described in connection with a horizontal carousel system, the present invention can be practiced with any of a variety of different types of storage systems. For example, the position indicator system can also be utilized with known static (non-moving) storage racks/shelves. As described previously, the indicator system would be positioned directly in front of the storage racks/shelves and the indicator would be moved such that it is positioned in front of the item to be processed. Typically in these cases, the message display bars would just be wider to accommodate the wider shelves typically associated with these racks.

Figure 25:
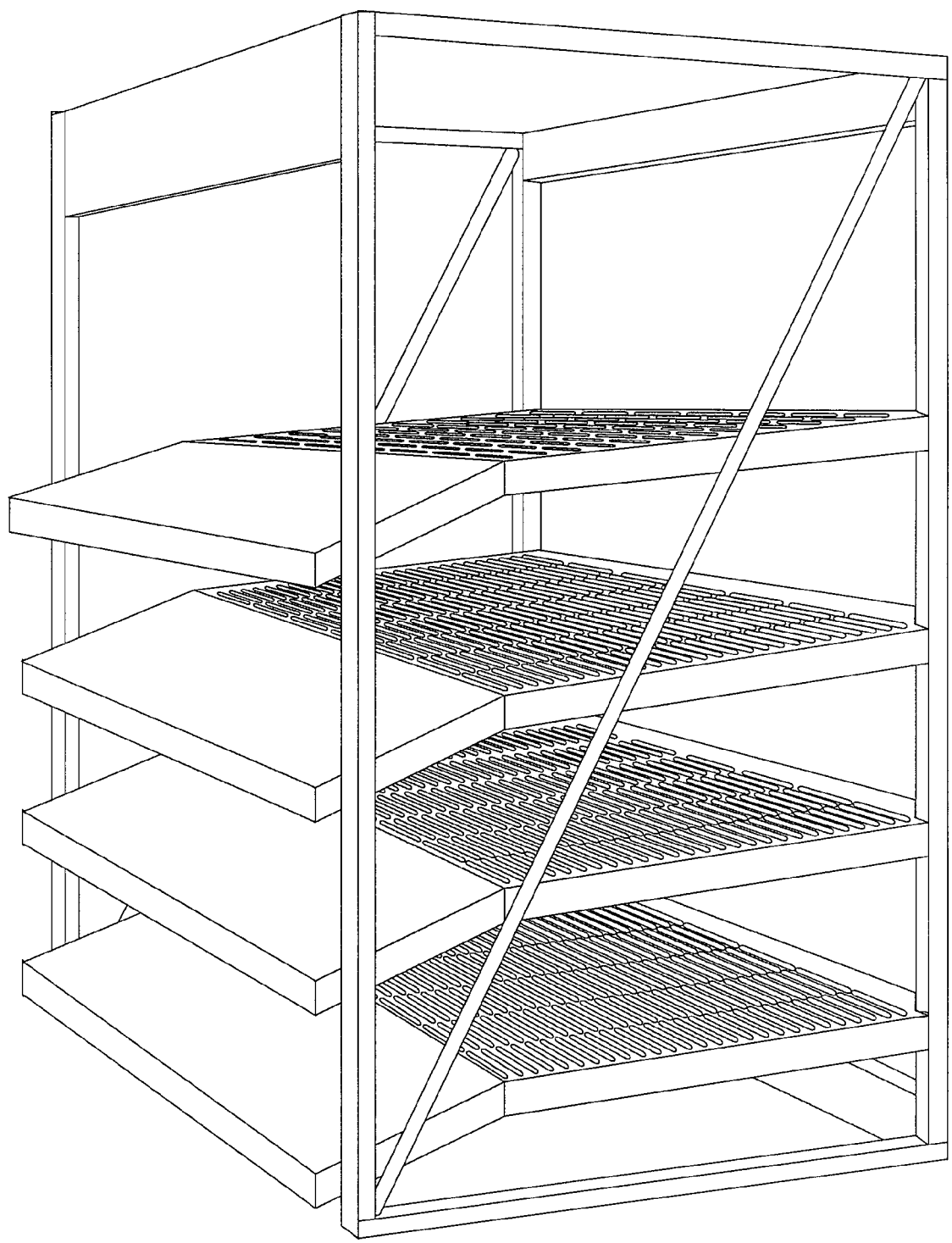
FIG. 25 illustrates a flow rack with which the position indicator system of the present invention can be used.

Additionally, the position indicator system can be utilized with "flow racks", e.g., shelves with rollers on them for infeed from behind. These types of devices are also known as a "carton flow rack". FIG. 25 illustrates such a flow rack. As described above, the indicator system would be positioned directly in front of the flow rack and the indicator would be moved such that it is positioned in front of the item to be processed.

Further, the indicator bar could also be oriented vertically and move horizontally instead of being oriented horizontally and moving vertically, as previously described, in accordance with the principles of the present invention. For example, the bar and motion axis are turned 90 degrees such that the bar is oriented vertically and moves horizontally such that it stops immediately left of, in front of, or immediately right of, a process location. In this manner, the indicator bar does not have to be positioned directly in front of a carrier system for operation, rather, it can be stationed adjacent to the storage shelves and then slide over to indicate the exact process locations. The indicator displays on the bar can then light up to indicate the position of the item to be processed.

Figure 26:
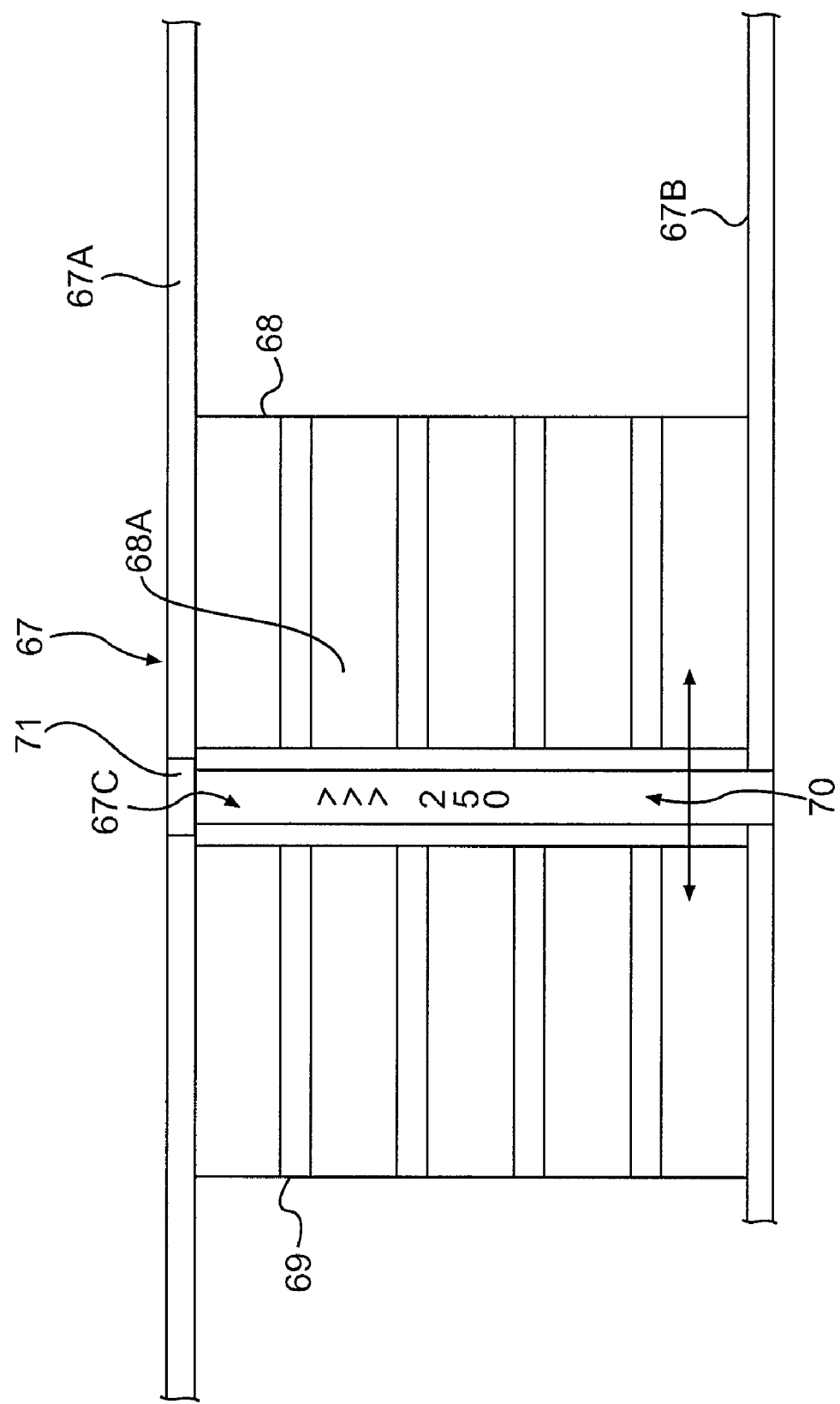
FIG. 26 indicates an embodiment of the present invention where the indicator bar moves horizontally instead of vertically.

FIG. 26 indicates an embodiment where the indicator bar moves horizontally instead of vertically. As can be seen, indicator system 67 includes upper track 67A, lower track 67B, and indicator bar 67C. Indicator bar 67C is oriented vertically and moves horizontally across carousels 68 and 69 on tracks 67A and 67B. As can be seen, the bar 67C has been moved horizontally on tracks 67A and 67B such that it is positioned in front of a bin 68A in which the item to be processed is located. Then, the appropriate message displays 70 light up along the bar 67C to indicate the location of the item to be processed. Of course, if the item was positioned lower with respect to bar 67C, lower lights would be lighted on bar 67C to indicate this lower position. Additionally, other information related to the process can be provided on bar 67C and/or on a display area 71 on indicator station 67. Display area 71 can be associated with the tracks and can be positioned between the carousels. As such, it can display various information associated with the process including instructions to the operator, etc., as disclosed previously in this specification.

In this manner, the indictor bar 67C, and thus the station 67, is not required to be initially positioned in front of any particular carousel system on which the item to be processed is located. The track(s) span the width of all the carousels that the message bar can be delivered (driven) to, creating an advantage of reduced system cost because a single motor is required for multiple carousels (or other storage shelving previously described). This is advantageous since typically a single operator serves multiple carousels (usually 3-4). Whereas two tracks are illustrated in FIG. 26, of course as described previously in connection with the other disclosed embodiments, the indicator bar can move on only one track. Also, one wide display serving multiple carousels can be contemplated.

Thus, in accordance with the principles of the present invention, the indicator bar can be oriented either horizontally or vertically such that it moves vertically or horizontally, respectively, such that it is positioned in front of the process location. With these two motion axis options, the indicator bar can be used to indicate process locations on adjacent, or separately located, horizontal carousels, static shelving, or flow rack systems without moving the frame of the indicator system. The indicator bar can either be configured with a fixed length or could be of a telescoping design such that it could be extended and retracted, as required, for indicating a process location. With the indicator of the present invention, the indicator is positioned immediately adjacent to the item to be processed such that the item is easily identifiable. The spatial relationship between the indicator and the item is such that minimal space exists between the item and the indicator. As such, no tote other than the tote that holds the item of interest is present between the indicator and the tote that holds the item of interest. In this manner, the indicator is always in front of the item to be processed. The indicator may be positioned above, below, directly in front of, or immediately adjacent to the item of interest.

The position indicator system of the present invention, as described above and below, may provide various advantages as summarized below.

Controlled/Restricted Access

The complete face of the carrier system, e.g., horizontal carousel, can be blocked during carousel motion. This can be accomplished by a variety of ways, one of which is the complete covering of the access area of the indicator system by the covers.

Only the shelf level that contains the item to be processed is exposed/accessible.

The control system for the indicator system can be managed such that only authorized users have access privileges. This can be provided by having the user enter an access code into the system before access is granted to the carrier system through the indicator system.

For carrier systems with totes as wide as the carrier, e.g., case picks, the present invention only exposes/indicates the item to be processed.

Monitored Access

Monitors, e.g., the photoeyes, "watch" the compartment access and can:

Record unauthorized accesses to a computer database associated with the indicator system.

Record video or still images to the database by the monitors.

An access to an incorrect location can be followed by an alarm, e.g., light or sound alarm.

Access to an incorrect location can trigger a video camera snapshot of the accessing person.

User Protection

Access to the face of the carrier system is blocked during carousel rotation.

If the closed cover area is penetrated, a photoeye behind this location is blocked such that this causes any carousel motion to stop.

The horizontal indicator bars, e.g., message center display strips, may have a touch switch strip on the inside edges, to stop motion of the carousel when touched. The lower trip edge could double as a process complete button.

The indicator system can provide a barrier, e.g., a clear panel or a door, to block access to a walk area defined by adjacent carousel systems.

The extrusion design of the indicator system makes it easy to connect to a lot of framing parts, glass panels, walls, etc., of carrier systems and other associated structures.

Product Protection

Vertical photoeyes outside the frame of the indicator system protect against approaching overhang product.

Vertical photoeyes inside the frame of the indicator system are multifunctional:

Detect overhang of product after the process cycle.

Verification of correct "zone" position during transaction.

Carousel motion stop if interrupted.

Processing Accuracy

Process point is indicated by (blinking) pointer LEDs directly above/below tote, therefore, little time is required by processor in thinking about processing task.

A transaction quantity is shown close to process point by indicator.

Access into a wrong location is annunciated by an alarm.

Indicator bars can be fitted with RFiD antennas, to verify items as they are pulled out of processing area (or inserted) dynamically.

Put Systems

Indicator bar(s) can show "batch lanes" and "quantity" information on carousel "put" shelf.

Photocells can "count" as articles fly by into the "put" tote-Indicator bar could show "counter" as they did.

RFiD

RFiD antenna(s) can be provided on moving indicator bar, reading items as they go into or out of the shelf.

System could use motion of moving indicator bar with antenna, to take automatic inventory of complete carousel. This process could include moving the indicator bar to a carrier, scanning it from top-to-bottom, driving it to the next carrier, scanning it from bottom-to-top, and repeating until last carrier is scanned.

Processing Speed

Transaction data is directly at the process point, e.g., at indicator bars, so there is no need to look a distance away and memorize position and quantity information from an adjacent indicator display.

Operator can confirm "Done" via voice control after process is made on-route to the batch station.

Operator could step off of a mat in front of the position indicator system, which would signal automatic process confirmation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for indicating a position of an item to be processed from a shelf, comprising:
   a frame member; and
   an indicator moveable on the frame member such that the indicator is positionable in front of the item to be processed from the shelf, wherein the movable indicator is a moveable bar and wherein an indicator light is included on the moveable bar such that the light is moveable such that it is illuminatable in front of the item to be processed from the shelf.

2. The apparatus according to claim 1, wherein the frame member is disposed vertically, wherein the indicator is disposed horizontally, and wherein the indicator is vertically moveable on the frame member.

3. The apparatus according to claim 1, wherein the frame member is disposed horizontally, wherein the indicator is disposed vertically, and wherein the indicator is horizontally moveable on the frame member.

4. The apparatus according to claim 1, wherein the indicator includes a first bar and a second bar and wherein the first bar and the second bar are positionable such that the item to be processed from the shelf is located between the first bar and the second bar.

5. The apparatus according to claim 1, wherein the bar includes identification information associated with the item to be processed from the shelf.

6. The apparatus according to claim 1, further comprising a cover associated with the indicator, wherein the cover is adjustable such that an item not to be processed from an other shelf is disposed behind the cover.

7. The apparatus according to claim 1, further comprising a plurality of photocells associated with the frame member.

8. The apparatus according to claim 1, wherein the indicator includes an RFiD reader.

9. The apparatus according to claim 1, wherein the shelf is included in a horizontal carousel system.

10. A method for indicating a position of an item to be processed from a shelf, comprising the steps of:
moving a moveable indicator on a frame member such that the moveable indicator is positioned in front of the item to be processed from the shelf, wherein the movable indicator is a moveable bar and wherein an indicator light is included on the moveable bar such that the light is moveable; and
illuminating the indicator light in front of the item to be processed from the shelf.

11. The method according to claim 10, wherein the frame member is disposed vertically, wherein the indicator is disposed horizontally, and wherein the step of moving the indicator includes the step of vertically moving the indicator.

12. The method according to claim 10, wherein the frame member is disposed horizontally, wherein the indicator is disposed vertically, and wherein the step of moving the indicator includes the step of horizontally moving the indicator.

13. The method according to claim 10, wherein the indicator includes a first bar and a second bar and further comprising the step of moving the first bar and the second bar such that the item to be processed from the shelf is located between the first bar and the second bar.

14. The method according to claim 10, further comprising the step of providing identification information on the bar associated with the item to be processed from the shelf.

15. The method according to claim 10, further comprising the step of covering an item not to be processed from an other shelf by a cover associated with the indicator.

16. The method according to claim 10, further comprising the step of detecting an activity by at least one of a plurality of photocells associated with the frame member.

17. The method according to claim 10, further comprising the step of identifying the item by an RFiD reader included on the indicator.

18. The method according to claim 10, wherein the shelf is included in a horizontal carousel system.

19. The apparatus according to claim 1, further comprising a monitor disposed in an upper area of the frame member.

20. The apparatus according to claim 19, wherein the monitor is a flat panel display screen.

21. The method according to claim 10, further comprising the step of displaying information related to the item to be processed from the shelf on a monitor disposed in an upper area of the frame member.

22. The method according to claim 21, wherein the monitor is a flat panel display screen.

* * * * *